(12) United States Patent
Bricaud et al.

(10) Patent No.: US 6,544,074 B2
(45) Date of Patent: Apr. 8, 2003

(54) ELECTRICAL CONNECTOR FOR SMART CARD

(75) Inventors: Herve' Guy Bricaud, Dole (FR); Yves Pizard, Dole (FR)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 0 days.

(21) Appl. No.: 09/809,590

(22) Filed: Mar. 15, 2001

(65) Prior Publication Data
US 2001/0010983 A1 Aug. 2, 2001

Related U.S. Application Data

(63) Continuation-in-part of application No. PCT/EP99/06887, filed on Sep. 17, 1999.

(30) Foreign Application Priority Data
Sep. 22, 1998 (FR) .............................................. 98 11789

(51) Int. Cl.[7] .................................................. H01R 23/70
(52) U.S. Cl. ...................................................... 439/630
(58) Field of Search .............................. 439/630, 326, 439/76.1, 341, 342, 633, 64

(56) References Cited

U.S. PATENT DOCUMENTS 5,823,828 A   10/1998  Bricaud et al.
6,039,599 A  *  3/2000  Benjamin et al. ........... 439/489
6,224,391 B1 *  5/2001  Horie et al. .................. 439/64

FOREIGN PATENT DOCUMENTS

EP   0845837 A2   6/1998
EP   0845837 A3   6/1998
FR   2737321      1/1997

* cited by examiner

Primary Examiner—P. Austin Bradley
Assistant Examiner—Phuongchi Nguyen
(74) Attorney, Agent, or Firm—Roger C. Turner

(57) ABSTRACT

A smart card connector includes an insulative support (52) with a horizontal card-engaging face (62) and contacts mounted on the support and having contact ends (102) projecting above the face to engage pads on the active face of a smart card. The pad-engaging ends lie within a contact-holding face part (202) which has a longitudinal length (L1) not greater than half the length of the card, with the card rear portion extending in a cantilevered fashion rearward of the contact-holding face part. The support has a rear edge (84), with the contacts having tails (104) lying at the rear edge, and with the tails protected by side guide extensions (88, 90). A card hold-down includes a sheet metal cover (54) that is soldered to a circuit board P on which the support lies. A switch (150) that detects full card insertion, lies in a polarized region (220) adjacent to the polarized wall (98) of the support.

7 Claims, 27 Drawing Sheets

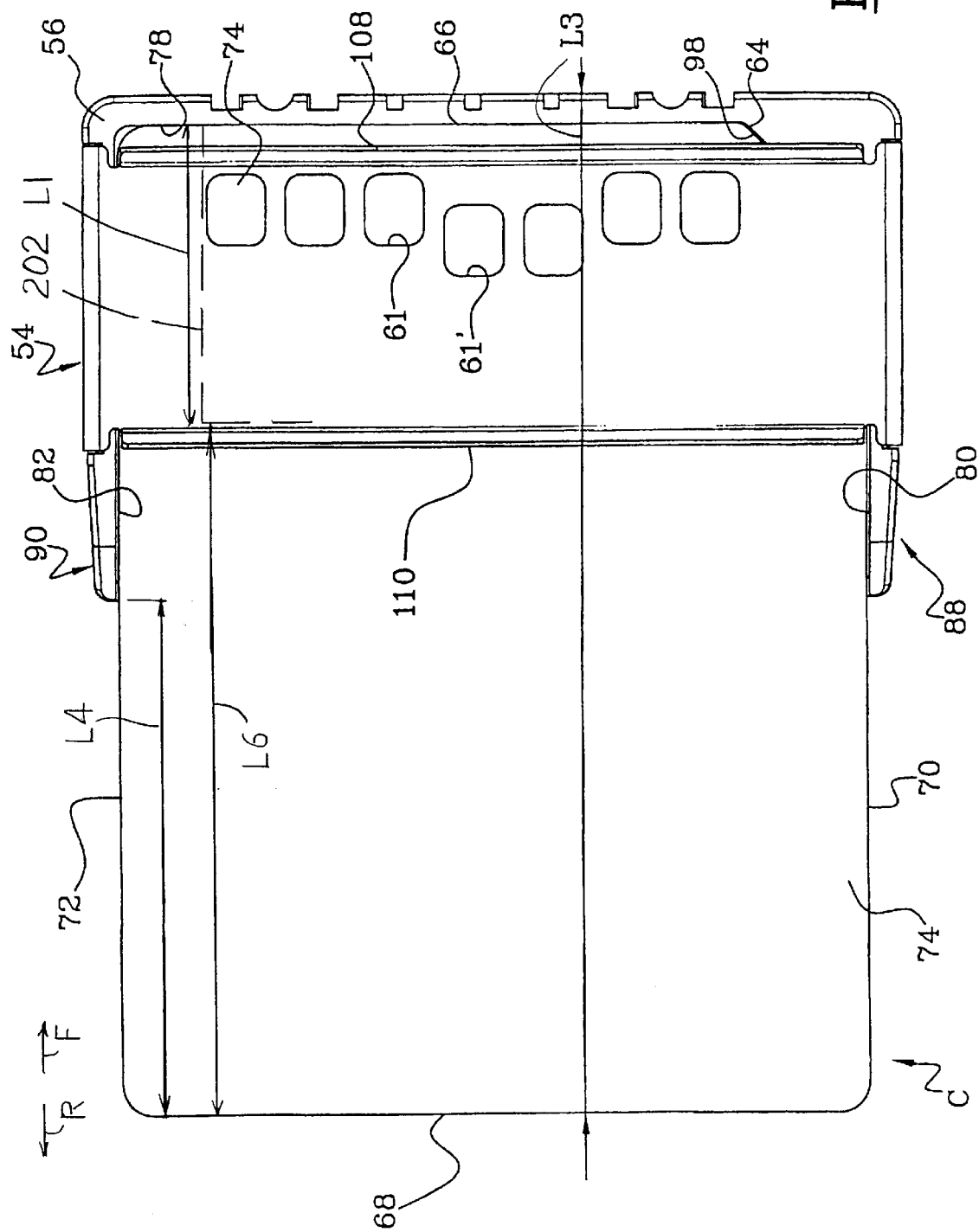

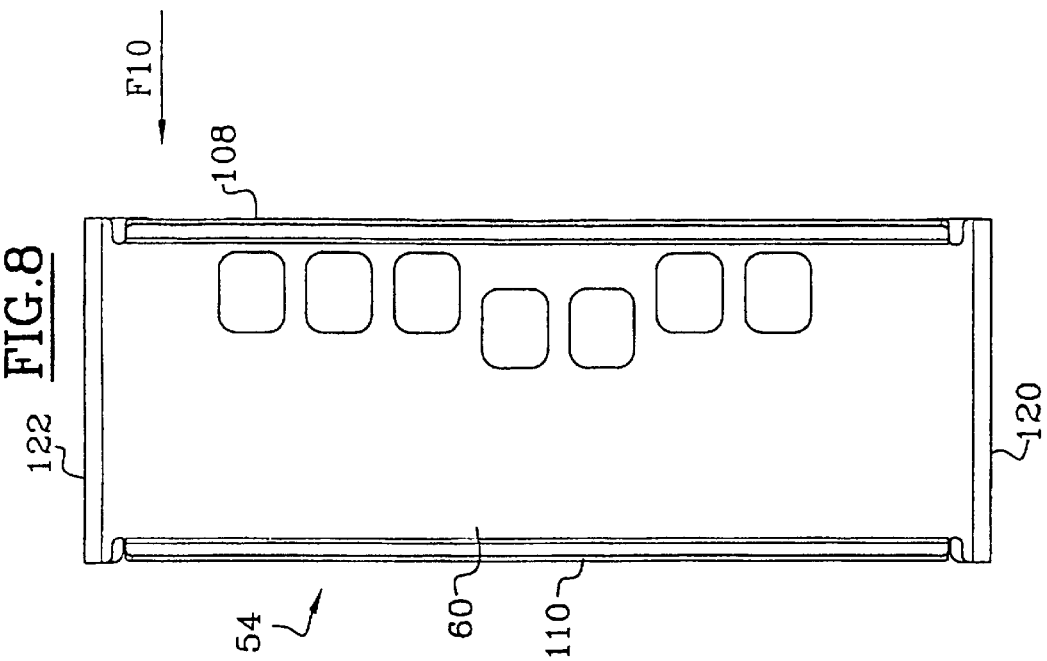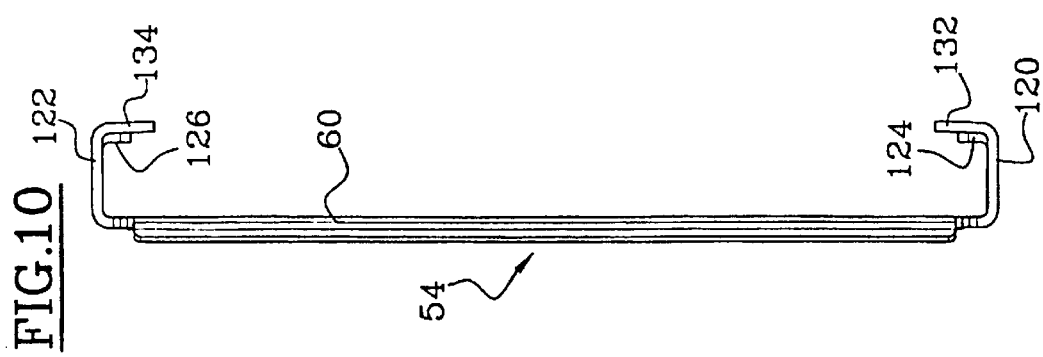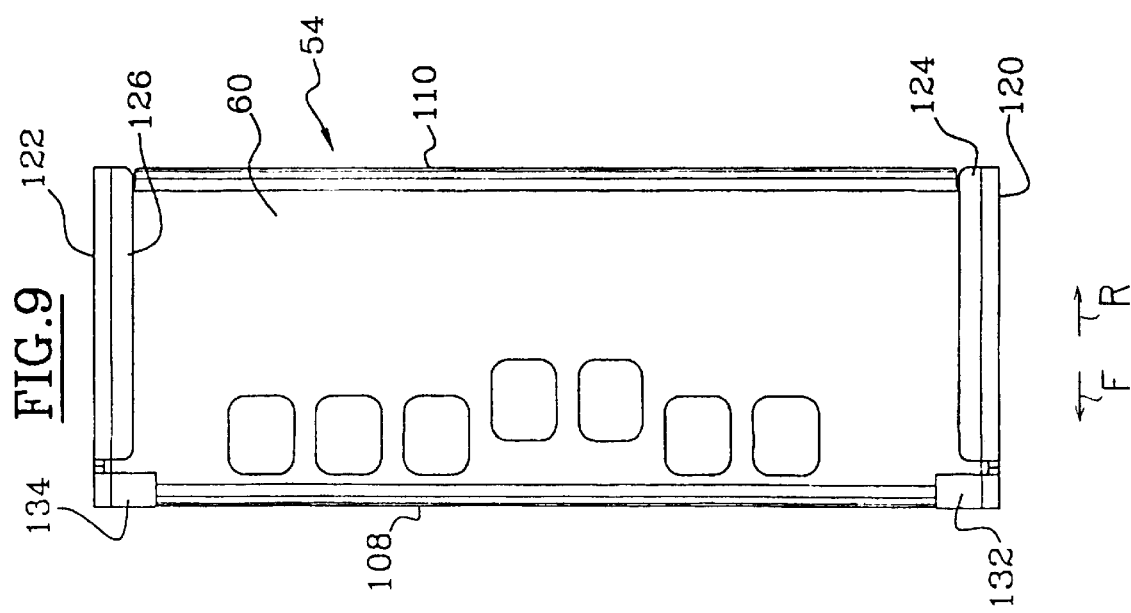

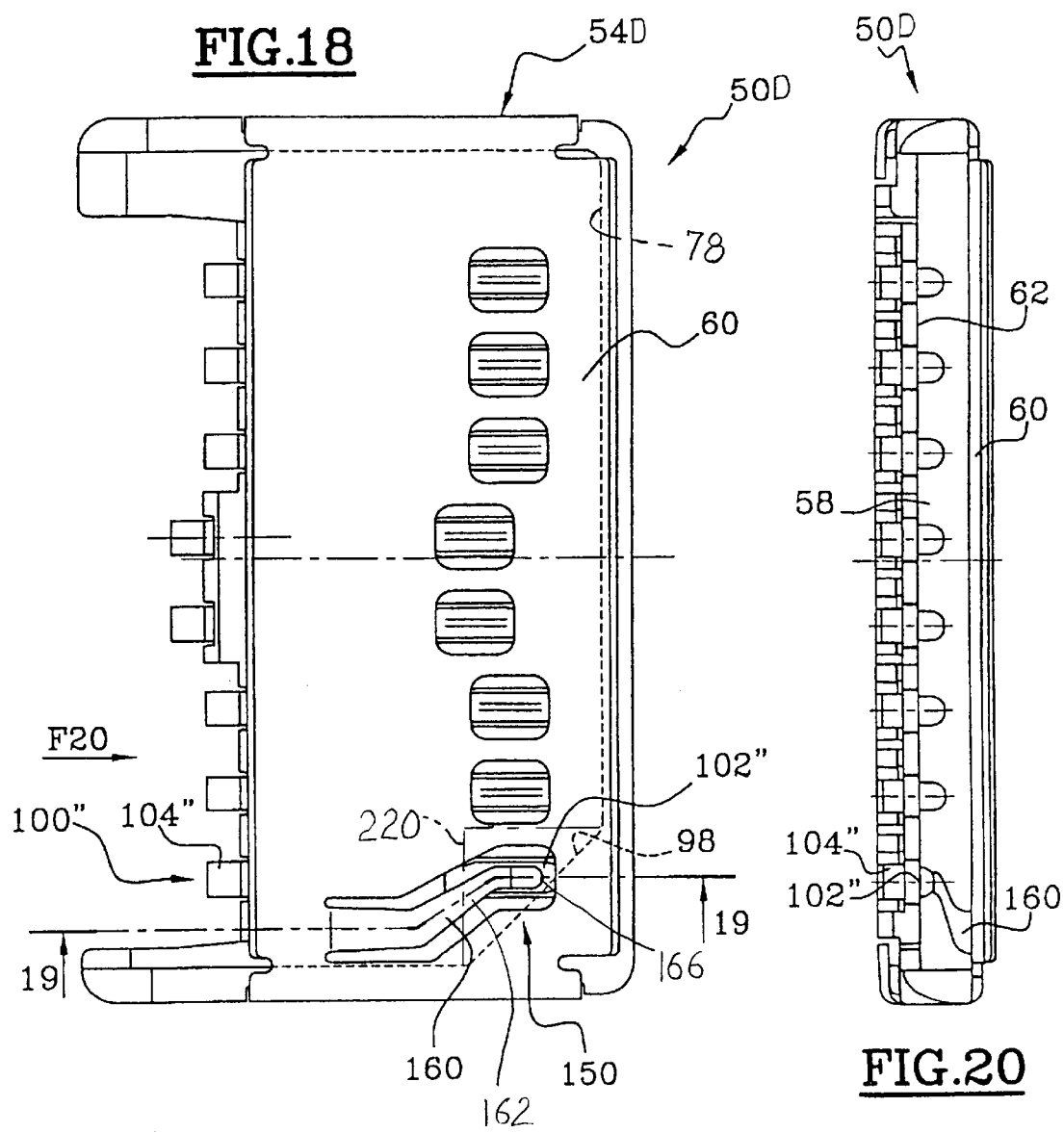

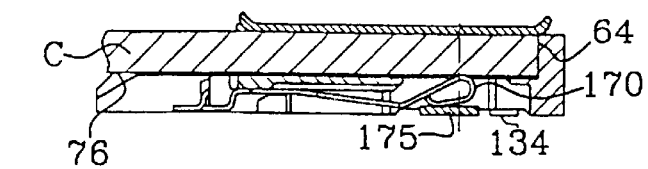
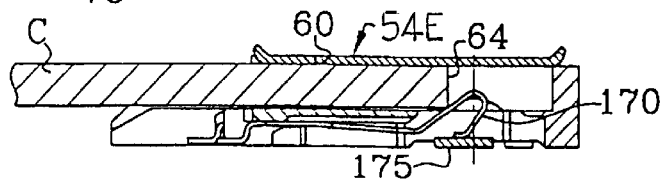
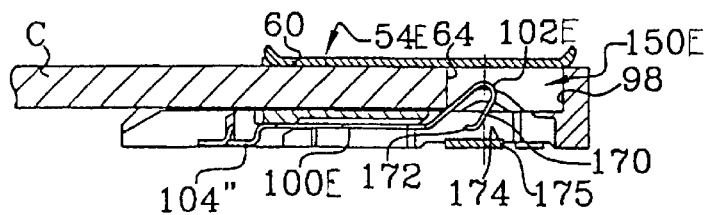
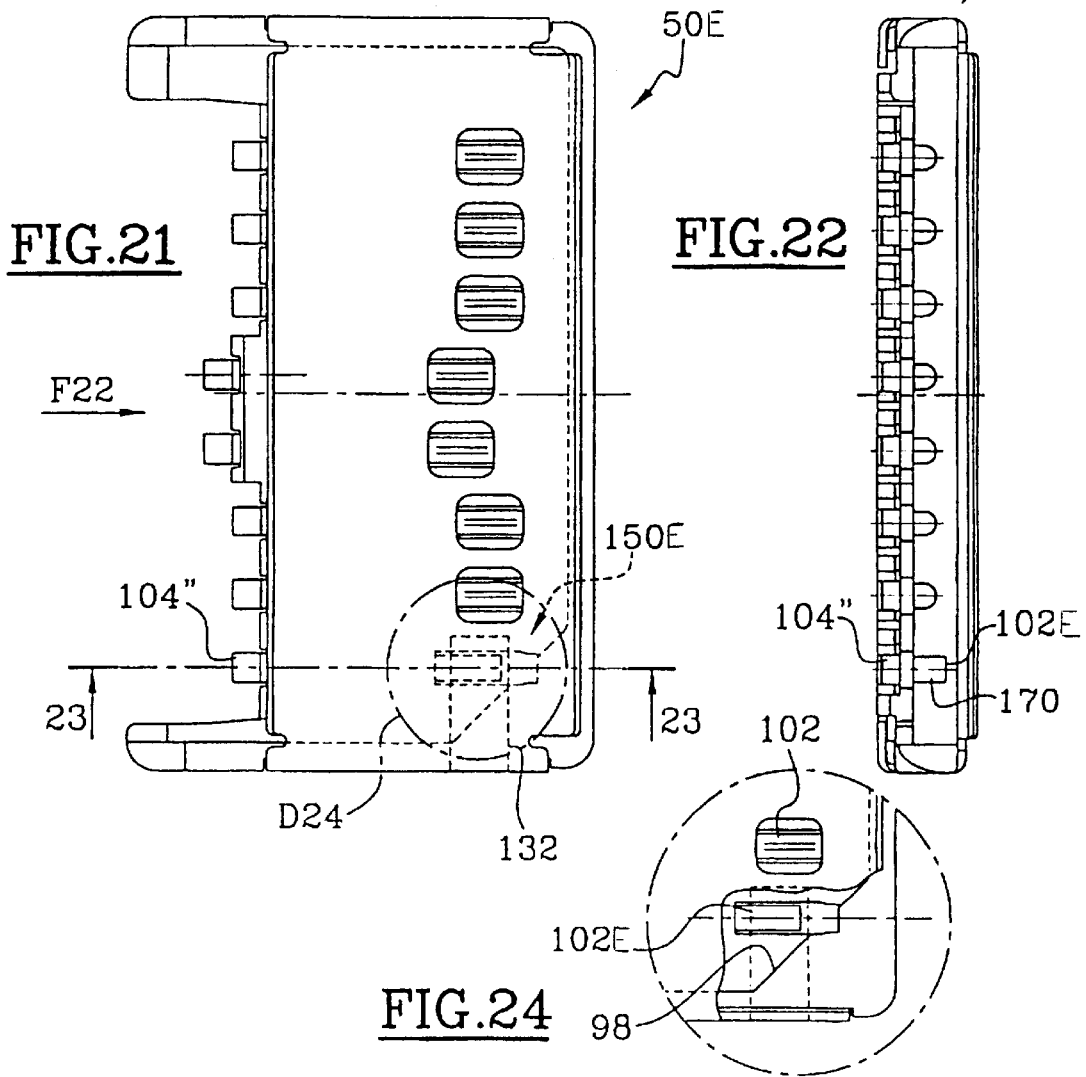

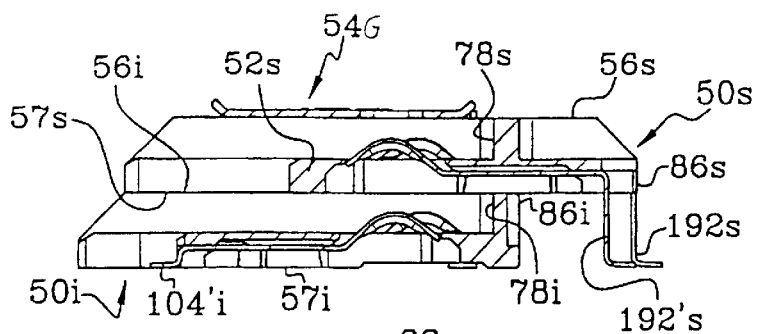
FIG.31
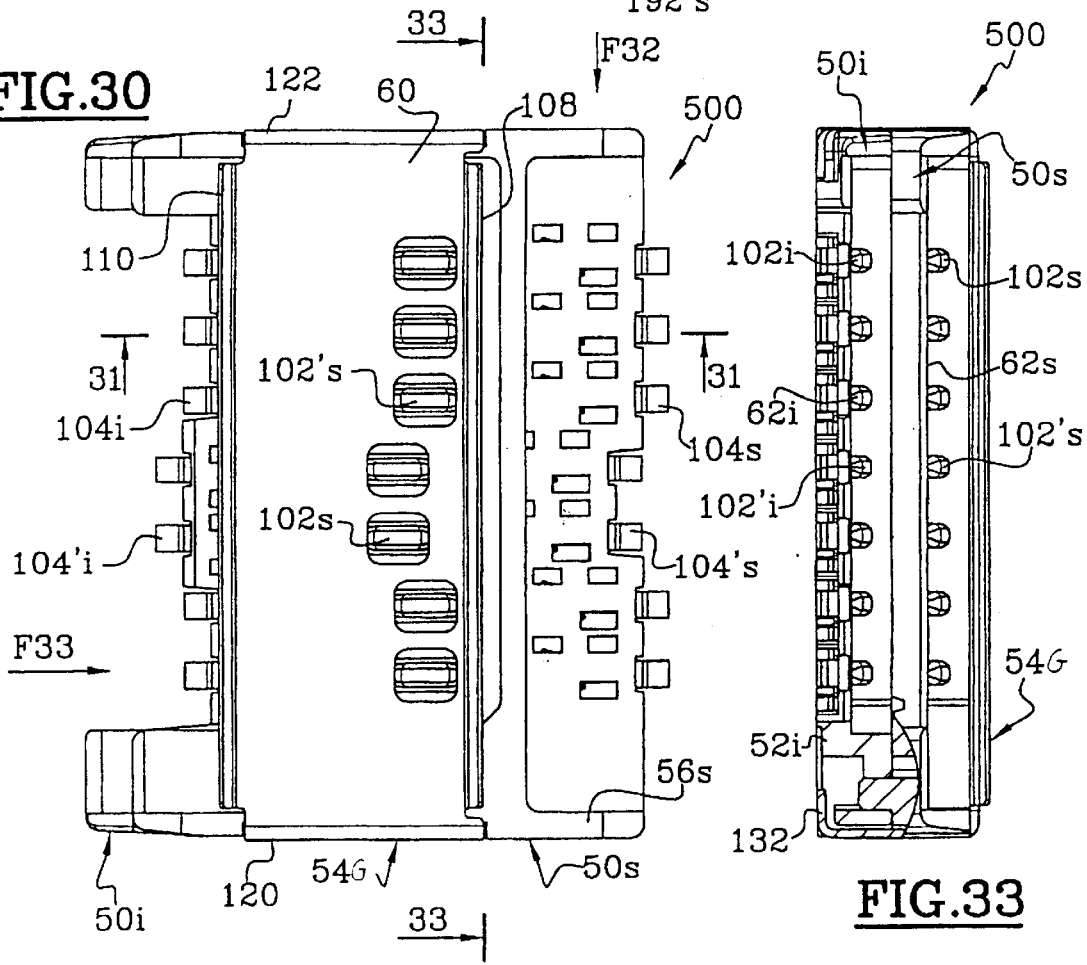
FIG.30
FIG.33
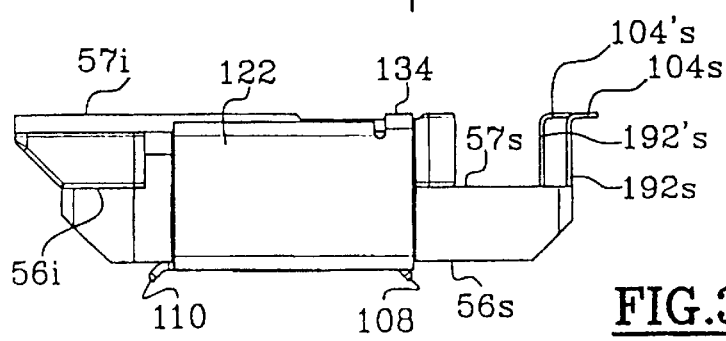
FIG.32

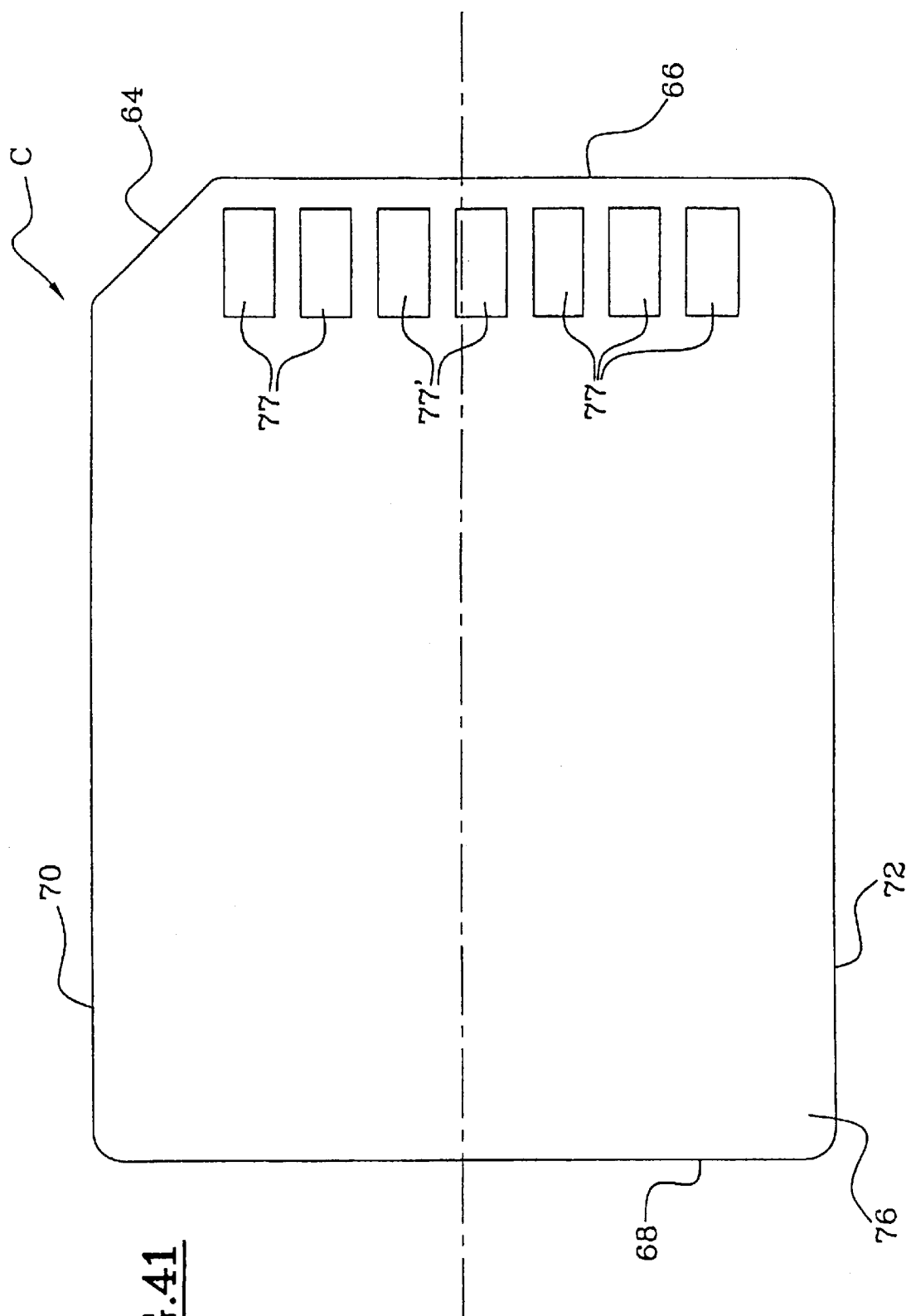

ELECTRICAL CONNECTOR FOR SMART CARD

CROSS-REFERENCE

This is a continuation-in-part of PCT Application PCT/EP99/06887 filed Sep. 17, 1999, which claims priority from French application 9817789 filed Sep. 22, 1998.

BACKGROUND OF THE INVENTION

Smart cards have active faces with pads thereon that are contacted to read and write the card. One type of connector for small standardized cards of the MICROSIM type, is described in French patent publication 2,742,561, wherein the connector has a horizontal face that supports the entire card and with contacts projecting slightly above the horizontal face. That publication also describes a sheet metal cover that slides on the support to enable full insertion of the card followed by sliding of the cover to hold down the card.

Another type of standard card is the MMC (MultiMediaCard) sold by Sandisk Company. The MMC card is similar to the MICROSIM card, but has a single row of pads at its front end and is of greater length. A connector similar to that described in the French publication but for an MMC card, would be of greater length. It would be desirable to provide an electrical connector for longer cards such as the MMC card, but where the connector had only a small length.

SUMMARY OF THE INVENTION

In accordance with one embodiment of the present invention, an electrical connector is provided where the connector has a small length compared to that of the smart cards to which it can be connected. The connector includes a card-engaging face with contacts mounted thereon, with the ends of the contacts that project above the face lying in a contact-holding face part of the card-engaging face. The card-engaging face part has a longitudinal length no greater than half the entire longitudinal length of the card, with a rear portion of the card extending in a cantilevered fashion rearward of the card-engaging face part when the card is fully inserted.

The contacts have tails for soldering to traces on a circuit board, the tails lying at the rear edge of the contact-holding face part. The support has side guide extensions that extends rearward of the rear edge of the contact-holding face part, to help guide the card and to protect the tails of the contacts during handling and transport prior to mounting.

The card is held down by a sheet metal cover that is fixed in position on the support. The cover has a main part lying above and parallel to the card-engaging face, flanges that extend downwardly at opposite sides of the support, and tabs at the lower ends. The tabs are soldered to traces on the circuit board.

The card has a polarized corner that extends about 45° to the front and side edges, and the support has a polarized wall that engages the polarized corner of the card to assure proper orientation of the inserted card. A switch that detects full insertion of the card, lies within a polarized region adjacent to the polarized wall.

The novel features of the invention are set forth with particularity in the appended claims. The invention will be best understood from the following description when read in conjunction with the accompanying drawings.

BRIEF DESCRIPTION OF THE DRAWINGS

FIG. 2 is a plan view of the connector and card of FIG. 1, with the card shown fully inserted in the connector.

FIG. 8 is a top view of only the metal cover of FIG. 7.

FIG. 9 is a bottom view of the cover of FIG. 8.

FIG. 10 is a front end view of the cover of FIG. 8, taken along arrow F10 in FIG. 8.

FIG. 18 is a plan view of a connector of another embodiment of the invention, with another switch for detecting the presence of a fully inserted card in the connector.

FIG. 19 is a sectional view taken on line 19—19 of FIG. 18.

FIG. 20 is a view taken along arrow F20 of FIG. 18.

FIG. 21 is a plan view of a connector of another embodiment of the invention with a different switch for detecting a fully inserted card.

FIG. 22 is a view taken along arrow F22 of FIG. 21.

FIGS. 23A, 23B and 23C are views taken on line 23—23 of FIG. 21, which illustrates three successive insertion positions of the card.

FIG. 24 is an enlarged view of area 24D of FIG. 21, with a portion of the cover being cut away.

FIG. 30 is a plan view of the double connector of FIG. 25, but without any card in place.

FIG. 31 is a sectional view taken on line 31—31 of FIG. 30.

FIG. 32 is a side elevation view taken along arrow F32 of FIG. 30.

FIG. 33 is a sectional view taken on line 33—33 of FIG. 30.

FIG. 41 is diagrammatic representation of the active face of an MMC-type card.

DESCRIPTION OF THE PREFERRED EMBODIMENTS

Figure 1:
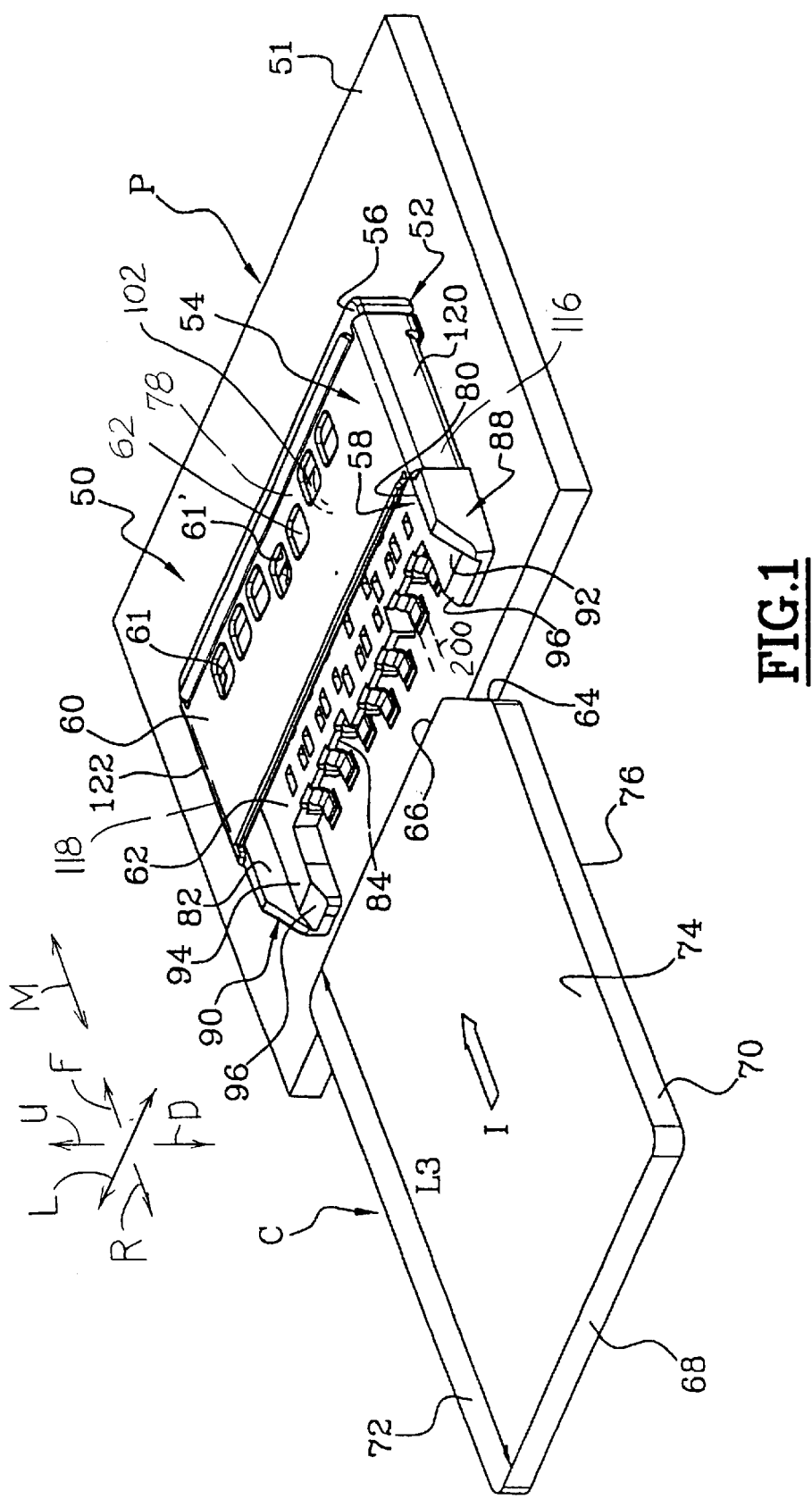
FIG. 1 is an exploded top isometric view of an electrical connector and an MMC-type card, with the card shown approaching insertion into the connector, and with the connector shown mounted on a circuit board.
Figure 14:
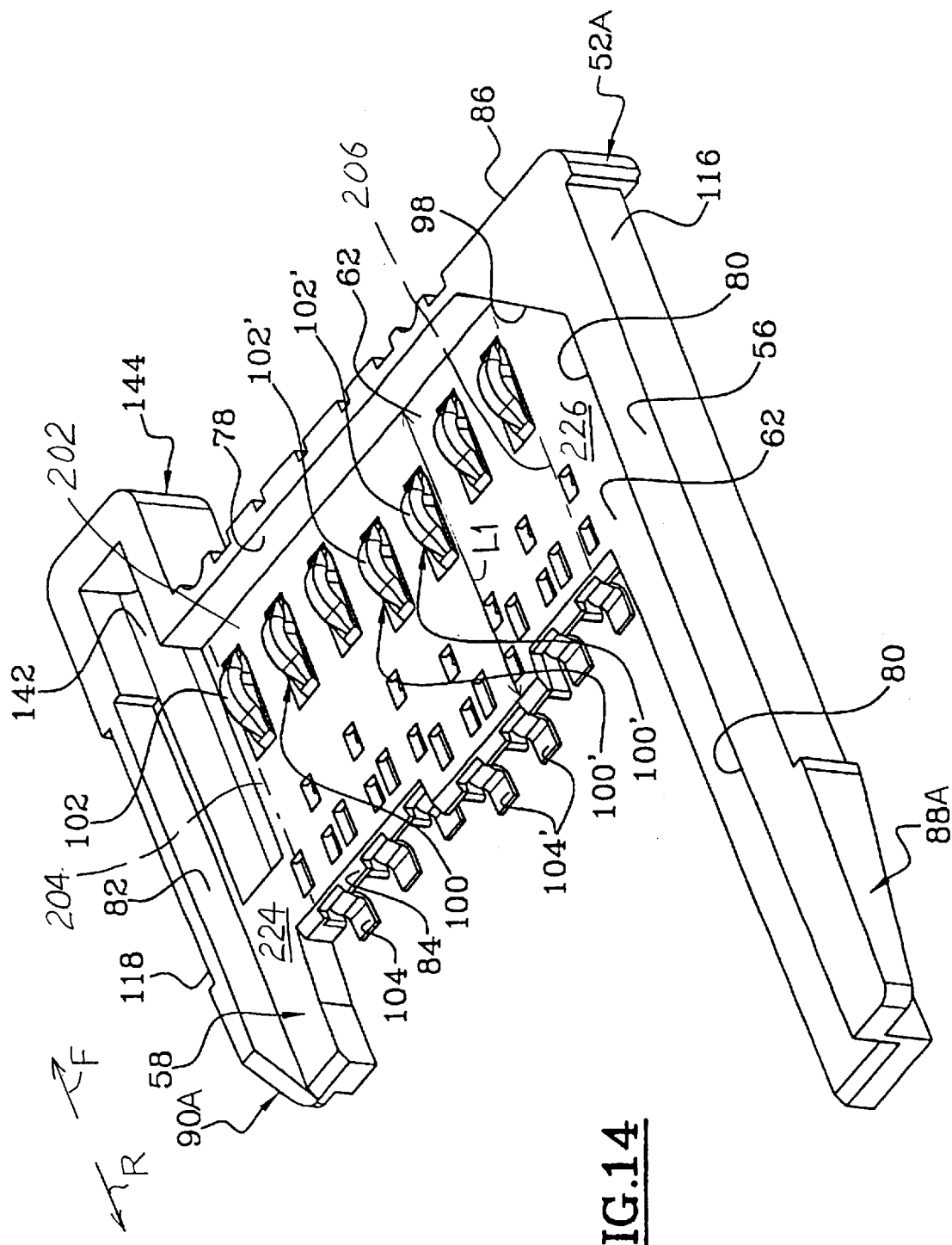
FIG. 14 is a view similar to that of FIG. 13, showing the connector, but without its metal cover or spring.

FIG. 1 illustrates an electrical connector 50 mounted on the upper face 51 of a circuit board P that has conductive tracks or traces 200 on its upper face. The connector includes a generally plate-shape insulative support 52 molded of plastic, and a sheet metal lid or cover 54. FIG. 14 is identical to FIG. 1 except for a rear spring-holding extension 144 and front longitudinal extension 88A. The support has an upwardly-opening cavity 58 with a horizontal card-engaging wall or face 62. A plurality of contacts 100, 100' are mounted on the support and have pad-engaging ends 102, 102' that project slightly above the card-engaging wall 62. This enable the contact pad-engaging ends to engage pads on an inserted card. An inserted card will have its active face lie facewise adjacent to the card-engaging wall or face 62 with a slight separation between them because of the upward force of the contact ends.

The cavity 58 is open not only upwardly but rearwardly R in order to receive a circuit card shown at C in FIG. 1. The particular card is an MMC-type card, which has a row of contact pads on its lower or active face 76, with the row lying close to the card front edge 66. The card has a generally rectangularly shape when viewing its upper or lower faces 74, 76. The card has a front laterally L extending edge 66, a rear edge 68, and a pair of laterally-spaced edges 70, 72. The card has a front polarized corner 64 that extends about 45° to the lateral L and longitudinal M directions. The polarized corner 64 assures that the card will be inserted in a proper orientation. The circuit card is thin and flat, in that its longitudinal length and lateral width are each a plurality of times its thickness in up U and down D directions.

As shown in FIG. 41, which shows the active face of a MMC-type card, there is a laterally-extending row of contact pads 77 and 77' on the lower face 76 of the card. As shown in FIG. 1, the card is inserted in the forward F direction, indicated by arrow I until its front edge 66 abuts a front edge stop 78, shown in FIG. 14, which stops insertion of the card with the contacts engaging the pads on the card. The laterally opposite edges of the card are slidingly guided in the housing by parallel longitudinally-extending side edges 80, 82.

As shown in FIG. 14, all of the pad-engaging ends 102, 102' of the contacts lie within a contact-holding face part 202 that has laterally opposite edges or sides 204, 206. The card-engaging face also has a pair of laterally opposite face side areas 224, 226 that lie beyond the face part 202. The face part 202 has a rear edge at 84. Each of the contacts has a connection end or tail 104, 104' that lies immediately beyond the rear edge 84, where the tails are soldered to corresponding traces on the circuit board. The longitudinal length L1, shown in FIG. 3, of the face part 202 is short, so that the contacts can be formed with a relatively short length. The face part 202 where the contact ends 102, 102' are located, has a lateral width L5 that is shorter than the lateral width L2 of the card-engaging face. The support has two longitudinal extensions 88, 90 which are portions of the face side areas and side guide walls 80, 82, and which extend longitudinally rearward R beyond the rear edge 84 of the contact-holding face part 202. This increases the length of the side edges 80, 82 and of the bottom face at 92, 94, where the opposite side edges and bottom of the card are guided. In addition, the extensions protect the tails 104, 104' of the contacts against damage that they might otherwise encounter during handling prior to soldering to the circuit board. FIG. 2 shows the extensions 88, 90 being of relatively short length, with the length being less than the longitudinal length L1 of the card-holding face part, and preferably less than half as long. This results in a small "footprint" for the connector 50 of FIG. 1.

When the card is fully inserted, as in FIG. 2, more than half of the card, of length L6, is cantilevered behind the face part 202 of the support, with about half of the length L4 being cantilevered beyond the extensions 88, 90 at the laterally opposite sides of the support. As a result, the connector shown FIG. 2 can be of relatively small length and occupy only a small area on the circuit board, and still receive the card C which is of much longer length. The overhang L4 is preferably at least one-third the overall length of the card. It is noted that in some versions, as in FIG. 14, there is no overhang at one side.

As shown in FIG. 14, the support 52A has a polarizing edge 98 which extends about 45° to the direction of the side edges 80, 82, to abut the polarizing corner 64 as shown in FIG. 1, on the card C. As will be discussed below, applicant may provide a switch near the polarized edge 98 of FIG. 14 to better sense the card as it approaches close to its final inserted position.

In a standard method of connection to the MMC card, the card has two special contact pads 77' (FIG. 41) that are to be connected to a power supply before the other pads 77 are connected. For this purpose, two contact ends 102' shown in FIG. 14, are offset longitudinally rearward with respect to the contact ends 102 of the other five contact elements. All of the contacts 100, 100' are identical, with the contact tails 104' being offset rearwardly with respect to the other contact tails 104.

Figure 4:
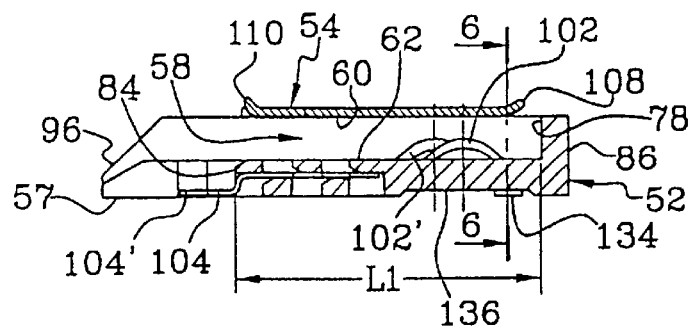
FIG. 4 is a sectional view taken on line 4—4 of FIG. 3.
Figure 3:
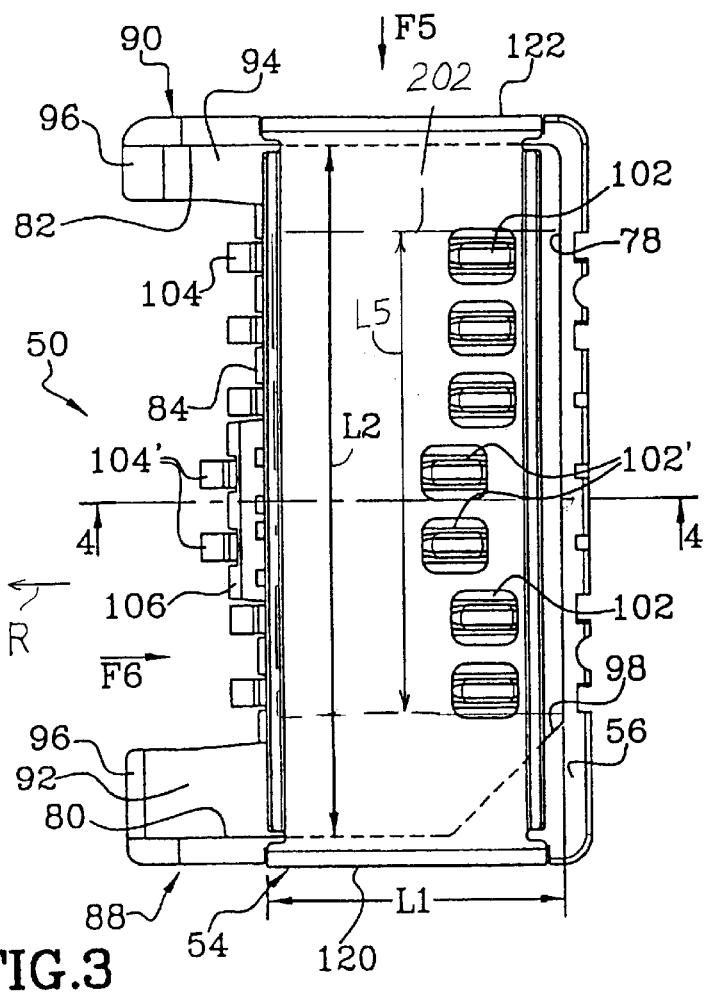
FIG. 3 is a plan view similar to that of FIG. 2, but without the card.

FIG. 3 shows that the longitudinal length L1 of the contact-holding face part 202 is less than the width L5 of the face part, and is much less than the overall width L2 of the cavity. Actually, the length L1 is about equal to one-third the total length of the card. As shown in FIG. 4, the length of the upper plate 60, between its front and rear edges 108, 110 is also approximately equal to the length L1 of the contact-holding face part.

FIG. 3 shows that the tails 104, 104' of the contacts are clear and visible to enable them to be soldered to traces on the circuit board by infrared soldering, and to allow a visual inspection of the soldered joints as well as any required repair. Also, as mentioned above, the lateral extensions 88, 90 protect the tails during manufacture and transportation of the connectors.

Figure 6:
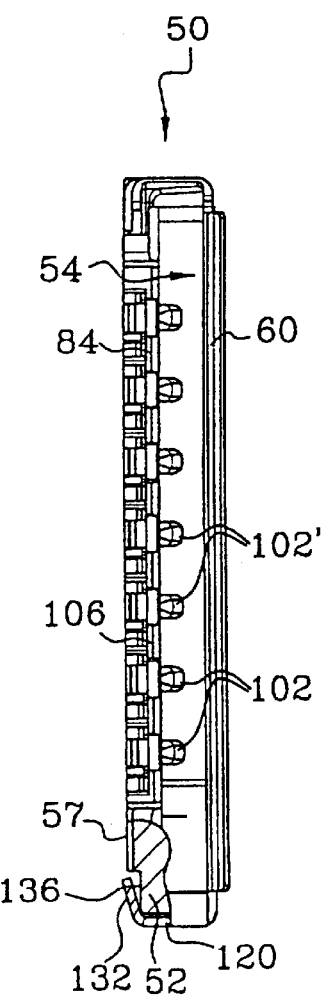
FIG. 6 is a rear elevation view taken along arrow F6 in FIG. 3, and with a detailed part shown in cross section as taken on line 6—6 of FIG. 4.
Figure 5:
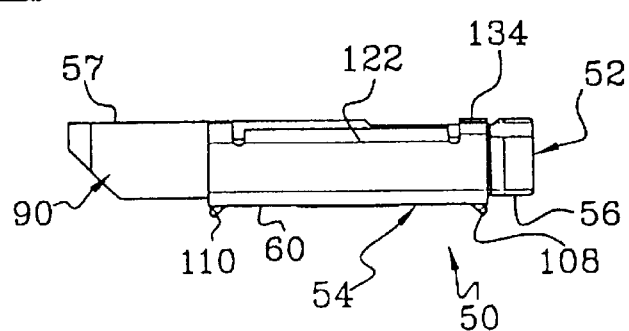
FIG. 5 is a side elevation view taken along arrow F5 of FIG. 3.
Figure 7:
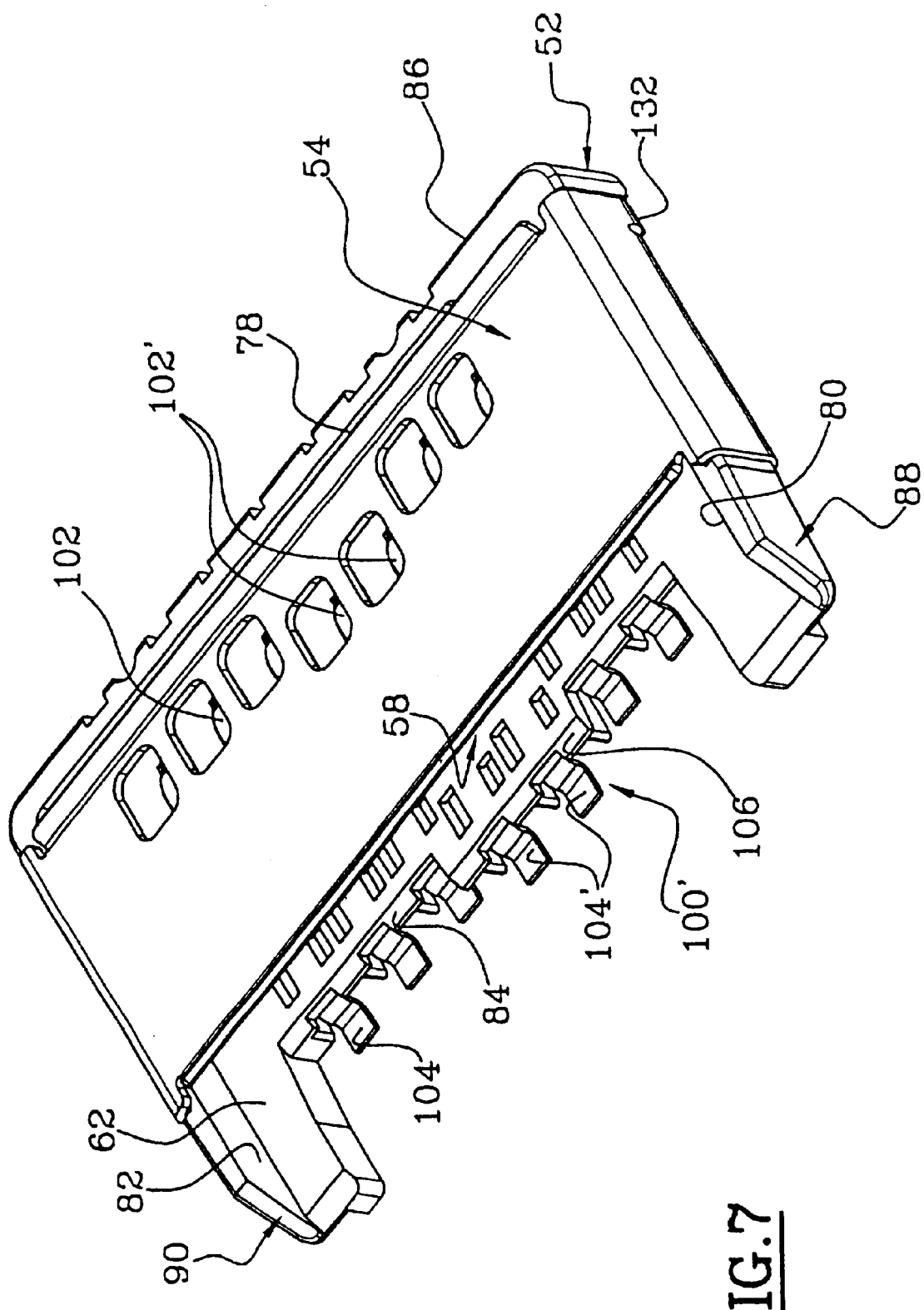
FIG. 7 is a top isometric view of the connector of FIG. 1, with modifications for making it easier to fit the metal cover on the support.
Figure 11:
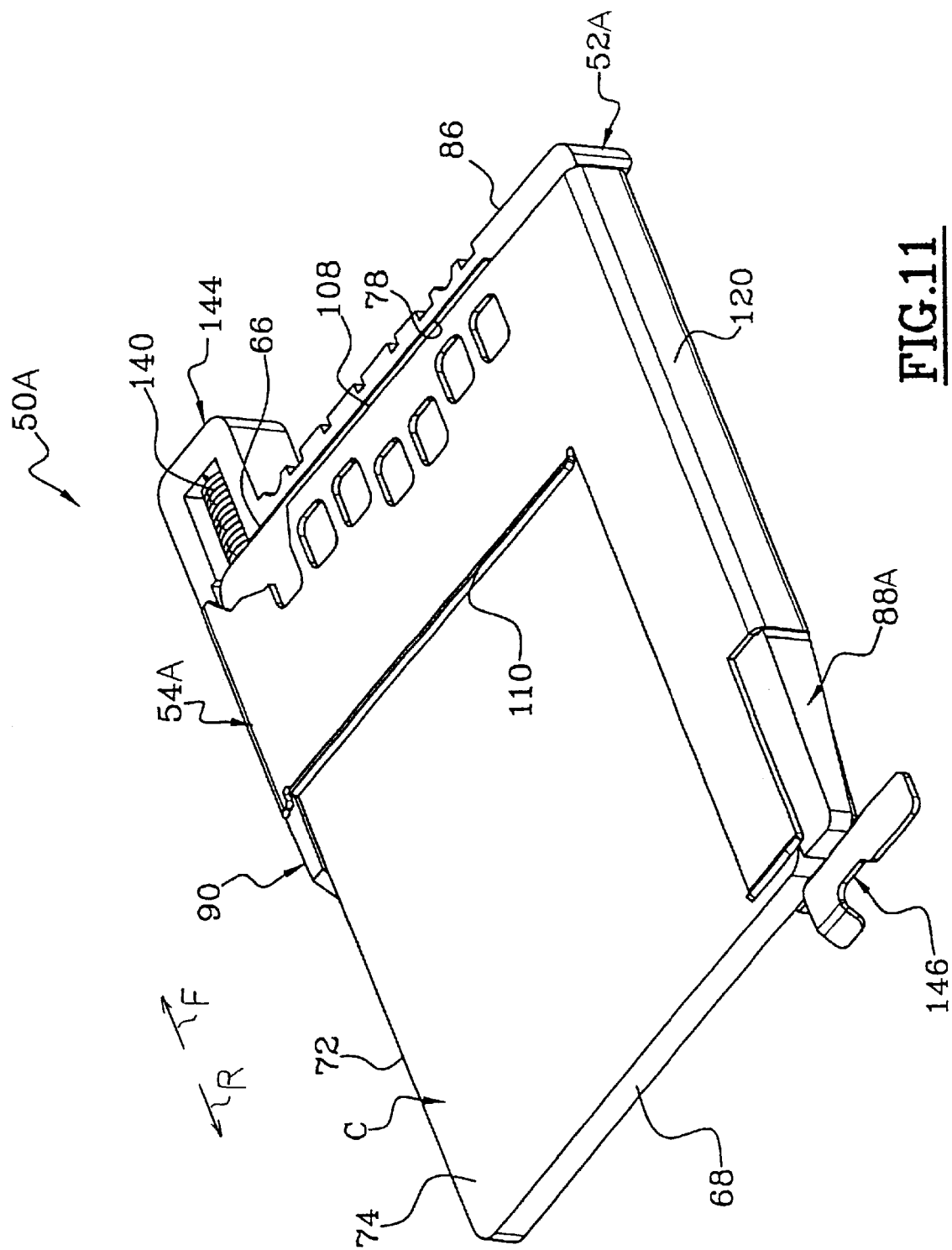
FIG. 11 is a top isometric view of a connector similar to that of FIG. 1, but modified to retain and eject the card, with the card being shown in its fully installed position.

The metal cover 54 (FIG. 1) has a plate-shaped main part 60 that is spaced from the card-engaging face 62 by slightly more than the thickness of the card, to press down the card so its pads engage the contacts. In order to mount the cover on the support, the cover is provided with two flanges 120, 122 at its laterally opposite sides. Each flange extends downwardly along a corresponding portion 116, 118 of the sides of the support. The lower ends of the flanges merge with inwardly-bent horizontal branches 124, 126 (FIG. 10) that lie under the lower face 57 (FIG. 6) of the support. The sides 116, 118 (FIG. 1) of the support are indented to form recesses with shoulders at their front and rear ends that prevent movement of the cover.

As shown in FIG. 9, the bottom of the cover has a pair of tabs 132, 134 at the front end of the cover, with the tabs lying in the same plane as the bottom branches 124, 126. The tabs lie in recesses 136 (FIG. 6) in the lower face 57. This allows the tabs to be soldered to traces on the circuit board, as by reflow soldering. Such traces on the circuit board are preferably connected to a ground potential so as to ground the metal cover.

Soldering of the tabs 132, 134 of the cover to traces on the circuit board, also mechanically holds the cover to the board. Such fastening by soldering of the tabs, balances fastening of the rear ends or tails of the contacts, shown at 104, 104' in FIG. 3.

If a person attempts to lift the card, especially its rear end which is cantilevered rearward of the connector, the soldering of the tabs at the front end of the cover to the circuit board and the soldering of the contact rear ends or tails to the cover, resist lift up of the connector. In some cases this may be supplemented with posts that extend into holes in the circuit board.

Figure 12:
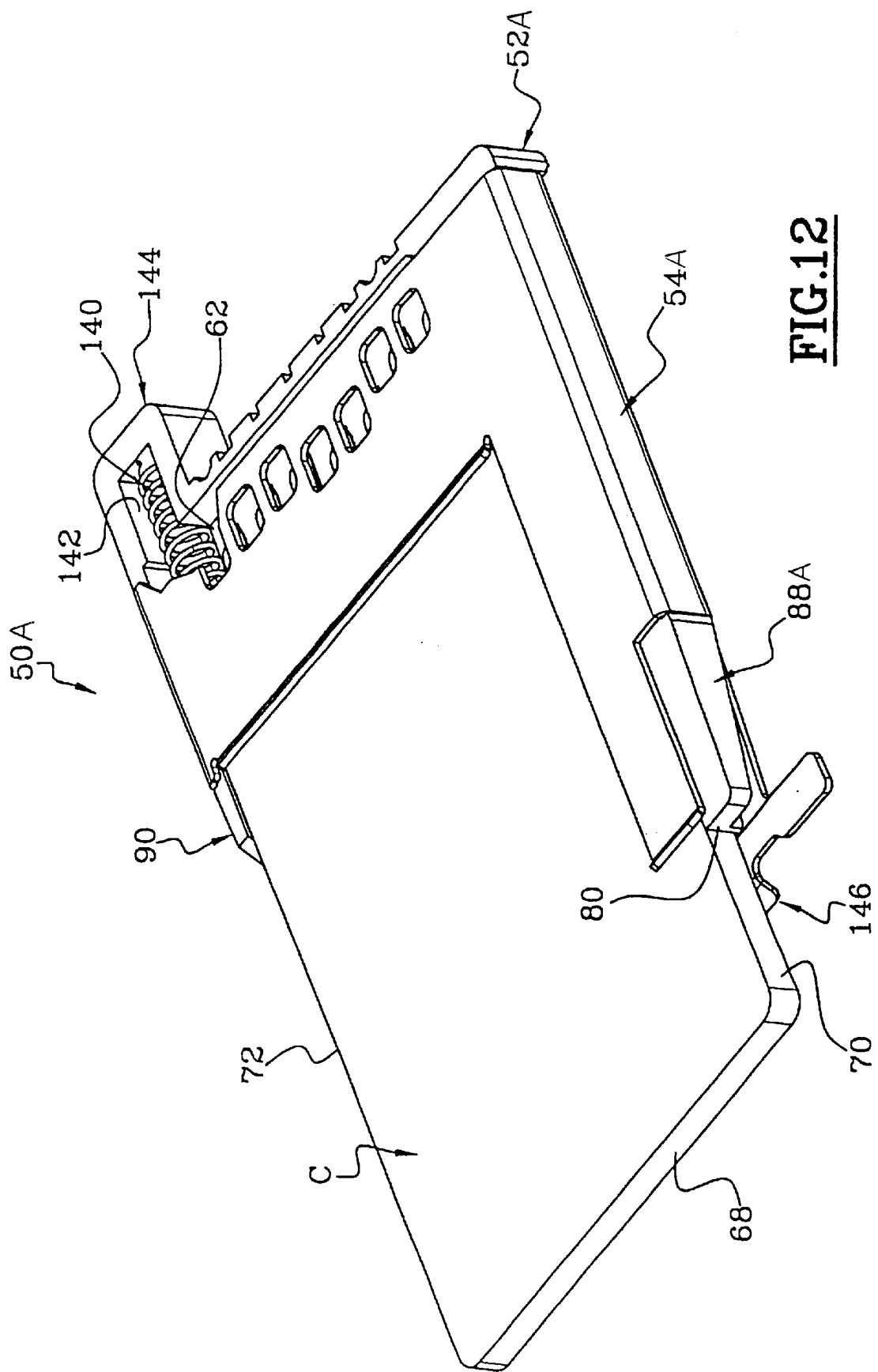
FIG. 12 is a view similar to that of FIG. 11, but with a card shown partially ejected.
Figure 13:
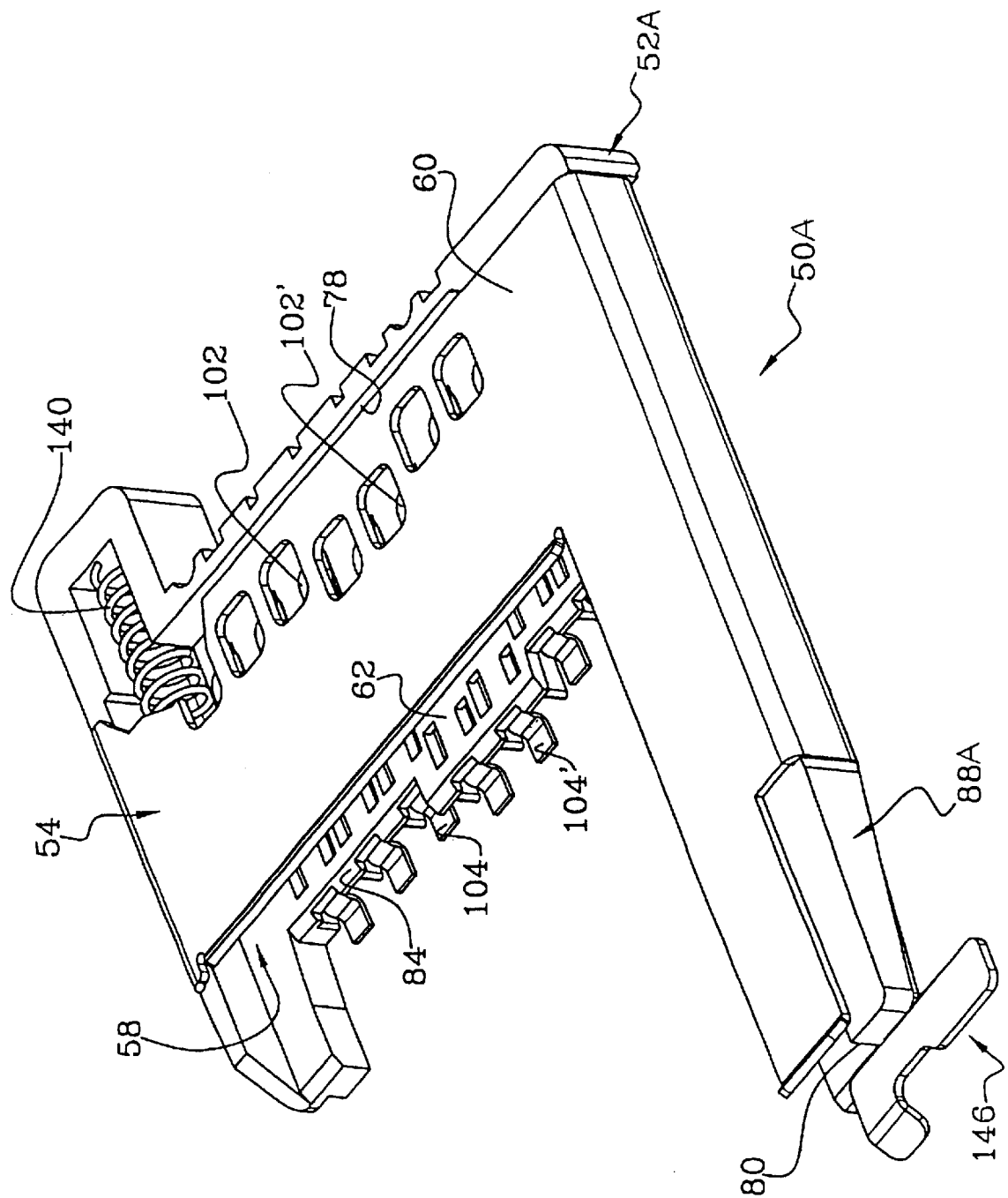
FIG. 13 is a view similar to that of FIG. 12, but without the card.

FIGS. 11–14 show a connector which is the same as that of FIGS. 1–10, except that the connector 50A of FIGS. 11–14 includes an ejection spring 140 (FIG. 11) that helps eject the card C. Also, the support 52A has a front extension 144 to hold the spring and a longer rear extension 88A, and the cover 54A has an arm with a retention tab 146. The tab 146 retains the card in its fully inserted position, against the ejection force of the spring. The tab 146 is part of the cover 54A, and is biased upwardly to abut the rear edge 68 of the card unless the tab is pushed downwardly, as shown in FIG. 12. Such downward force allows the spring 140 to partially eject the card.

As shown in FIG. 14, the rearward extension 88A lies at one side which is opposite the spring. The extension extends along substantially length of the card. As a result, the rearward force of the spring 140 against one side of the front end of the card, which tends to cause the card to turn about a vertical axis, is counteracted by the very long guiding edge 80 which engages the card.

Figure 15:
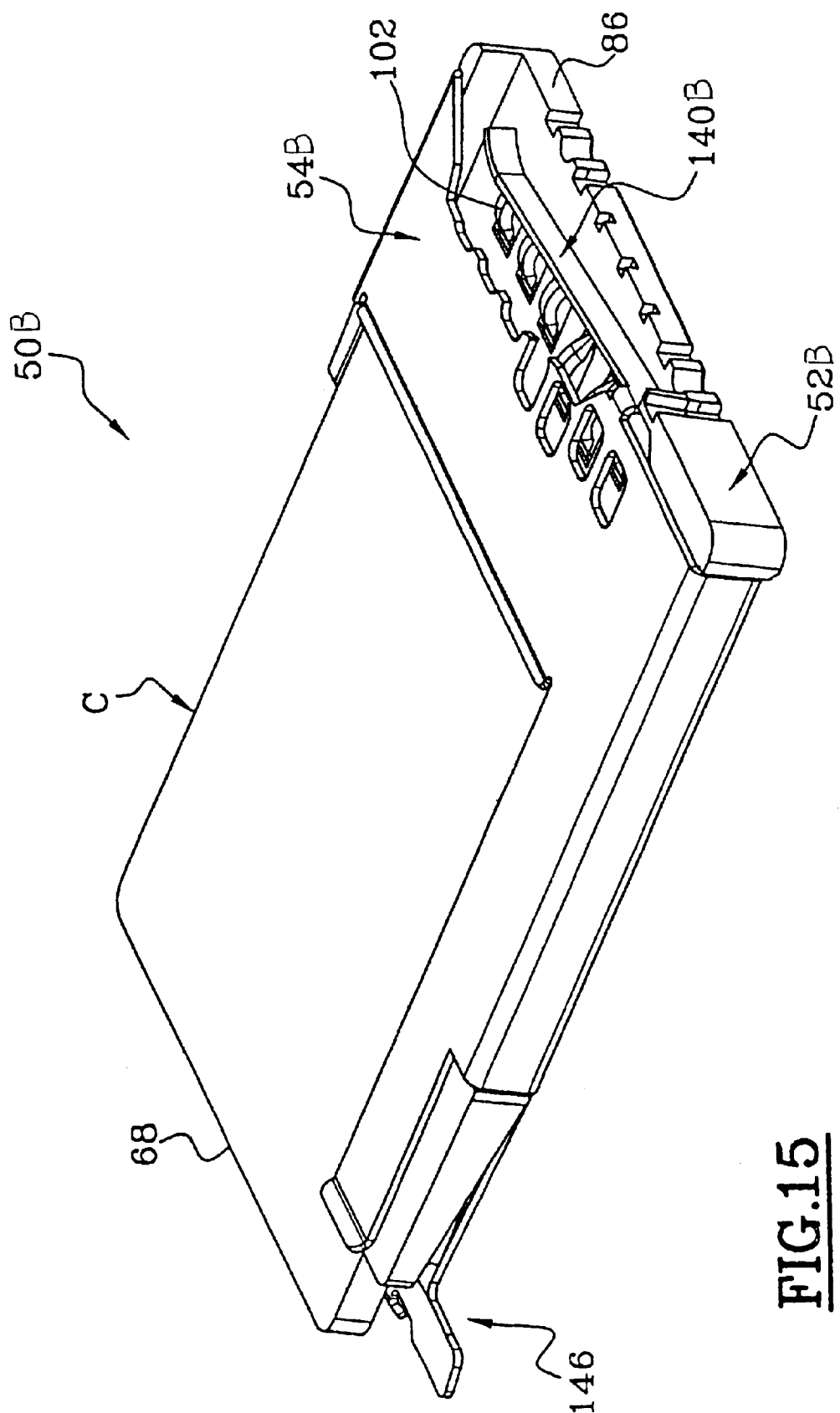
FIG. 15 is a top isometric view which shows a connector and partially inserted card, wherein the connector differs from that of FIG. 12 by the design of its spring for ejecting the card.

FIG. 15 shows a connector 50B which varies by the design of the ejection spring 140B, which is formed as part of the sheet metal cover 54B. This results in the insulative support 52B not requiring a front extension at one side to accommodate a coil spring.

Figure 16:
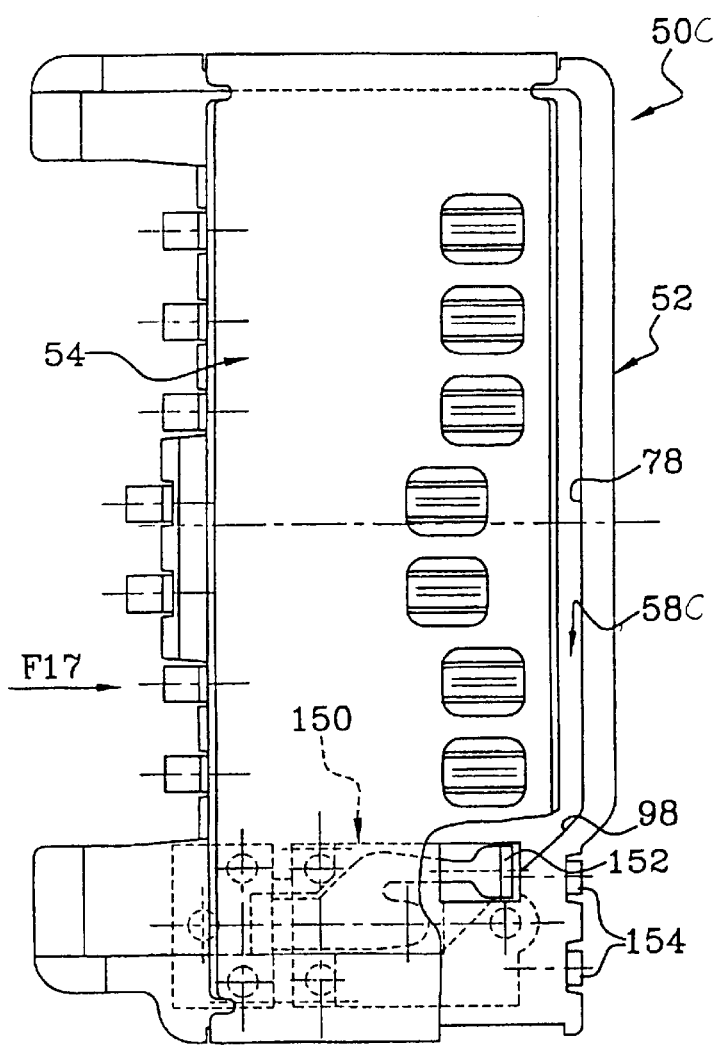
FIG. 16 is plan view of a connector of another embodiment of the invention, with a switch for detecting the presence of a fully inserted card.
Figure 17:
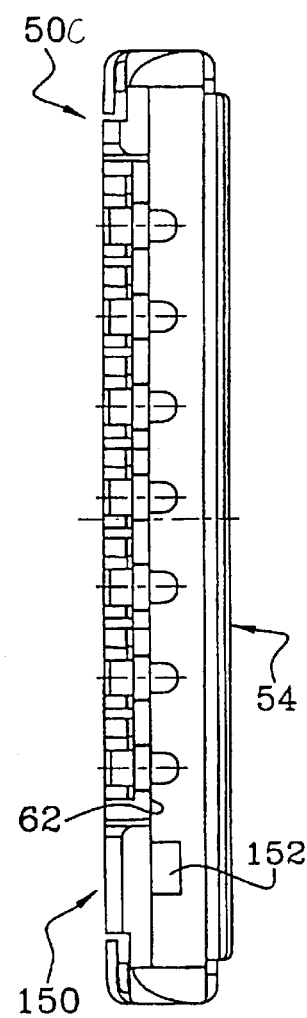
FIG. 17 is a view taken along arrow F17 of FIG. 16.

FIGS. 16 and 17 show a connector 50C which varies from that of FIGS. 1–10, by including a switch 150 for detecting the presence of a fully inserted card in the cavity 58C. The switch includes a pedal 152 which projects into the upward-facing face of the card. In order to detect a card only when the card is very close to the fully inserted position, the pedal 152 lies close to the 45° inclined polarized wall or edge 98. The switch has two connection leads or tails 154 that extend forward to be soldered to tracks on the circuit board.

FIGS. 18–20 show a connector similar to that of FIGS. 16 and 17, but with the switch 160 including a switch blade 162 formed in the cover 54D. As shown in FIG. 19, the blade, which is deformed at a downward incline, has a free end 166 that engages the contact end 102" of an additional contact 100" which has a tail 104". When a card is inserted and its polarized corner comes close to the final insertion position, the corner deflects the blade 162 of the switch upwardly while downwardly deflecting the contact end, to open the switch. As shown in FIG. 18, the switch blade 162 is of largely S-shape.

FIGS. 21–24 show a connector 50E with a switch 150E that is normally opened and that is closed by full insertion of a card. The switch 150E includes a contact 100E with a free contact end 102E that is best shown in FIGS. 23A, 23B, 23C. The free contact end 102E is bent into the shape of a loop with a loop end 170 having an extreme end 172. The extreme end 172 normally lies above a switch tab 175 on the metal cover 54E. The contact end 102E normally lies above the card-engaging face of the support.

As the card is inserted, its front edge, at its 45 degree angled polarized corner, depresses the end 102E to move the extreme end 172 against the switch tab 175 to close to switch. The shape of the loop results in a self-cleaning effect as the extreme end 172 slides against the upper face 174 of the switch tab 175. All switching forces are applied only to the lower face of the card, which avoids scratching the upper face, which is often decorated.

Referring to FIG. 2, it can be seen that the upper plate or main part 60 of the cover has a series of holes 61, 61'. These make it possible to test the equipment by inserting a probe through the holes and against the card-engaging ends of the contacts.

Figure 25:
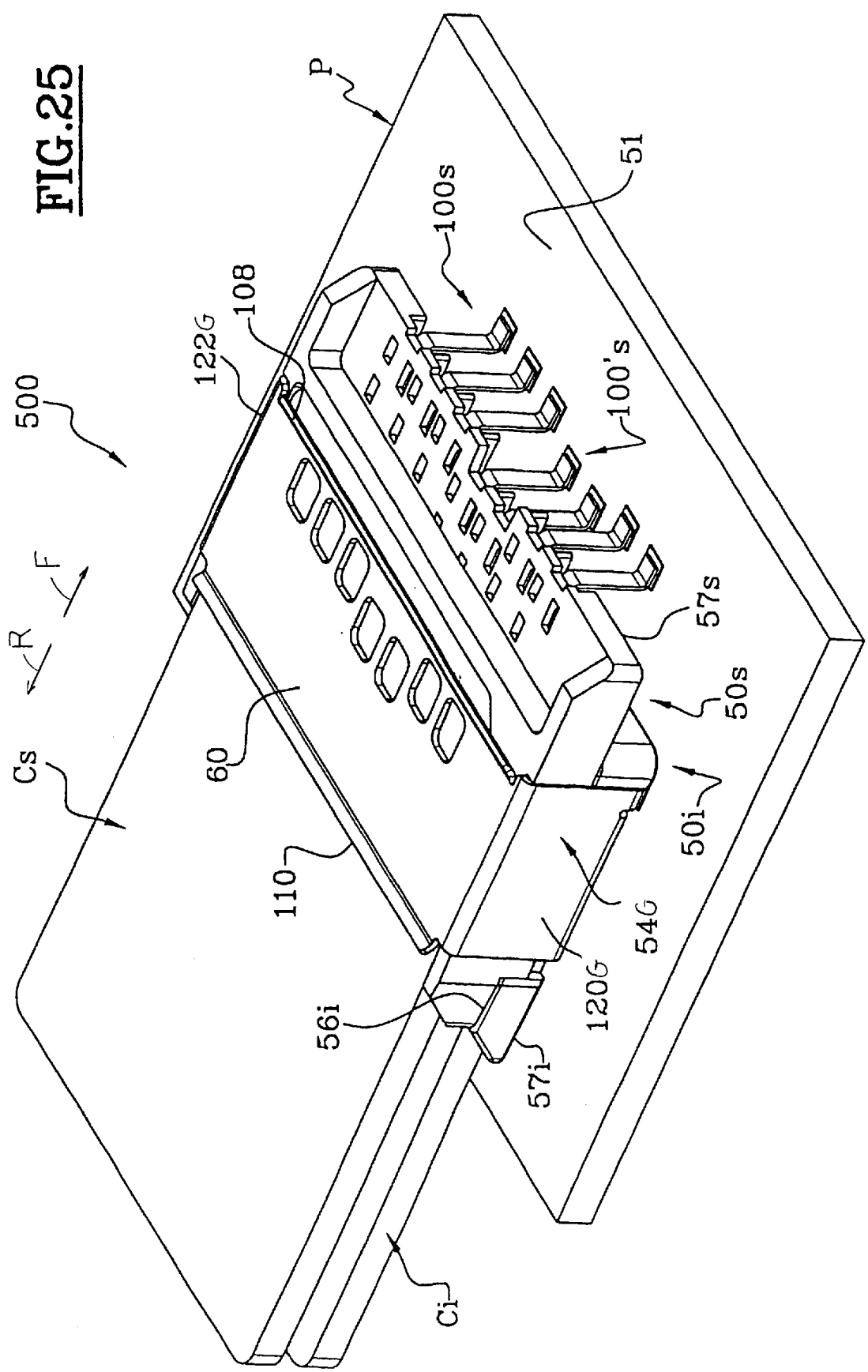
FIG. 25 is a top and front isometric view which illustrates a connector of another embodiment of the invention shown with two cards fully received therein, and with the connector being mounted on a circuit board.
Figure 34:
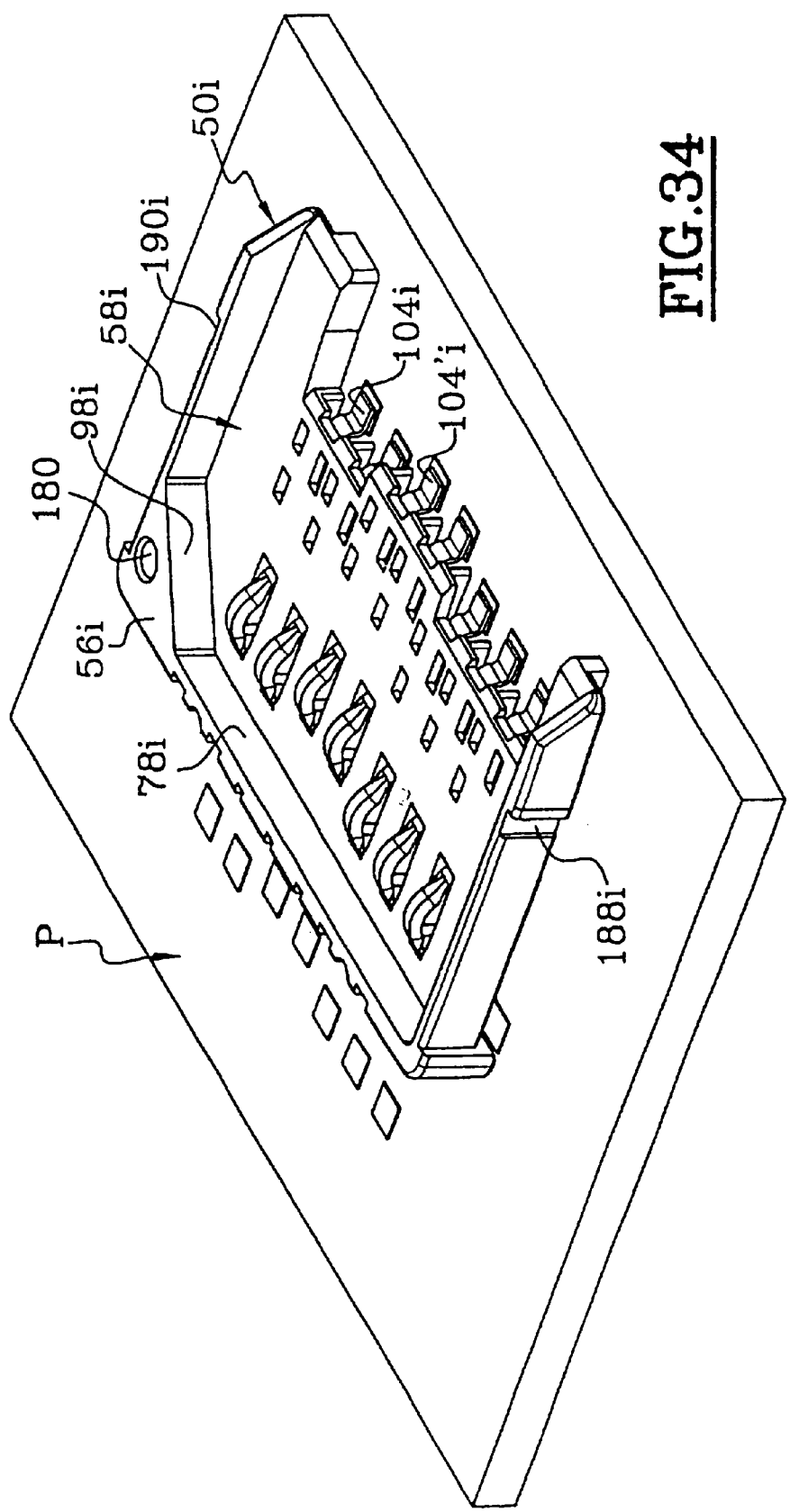
FIG. 34 is a top isometric view of the bottom connector of the double connector of FIG. 25, without any card in place, and showing the bottom portion mounted on a circuit board.
Figure 35:
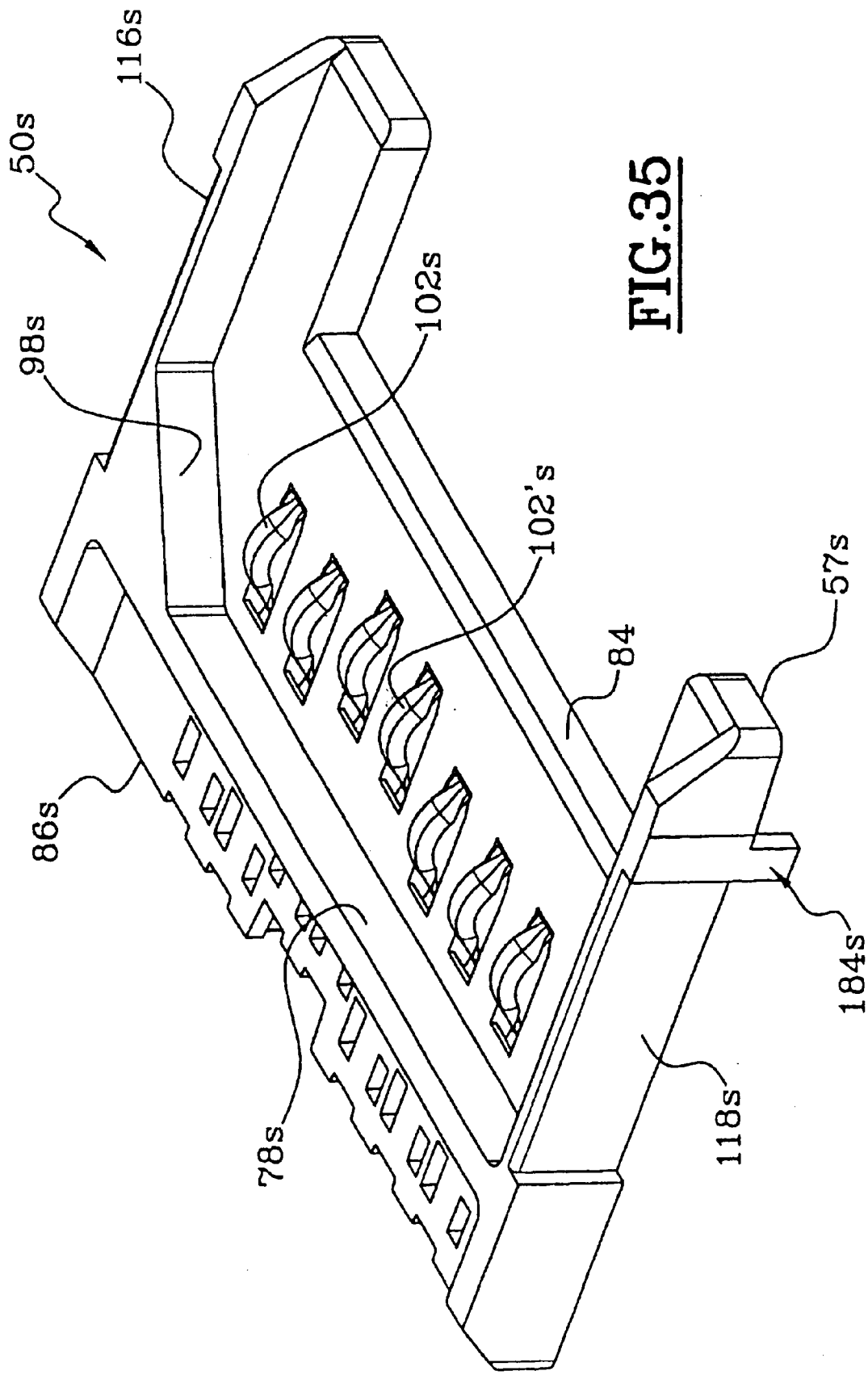
FIG. 35 is a top isometric view showing the upper connector of the double connector of FIG. 25.
Figure 36:
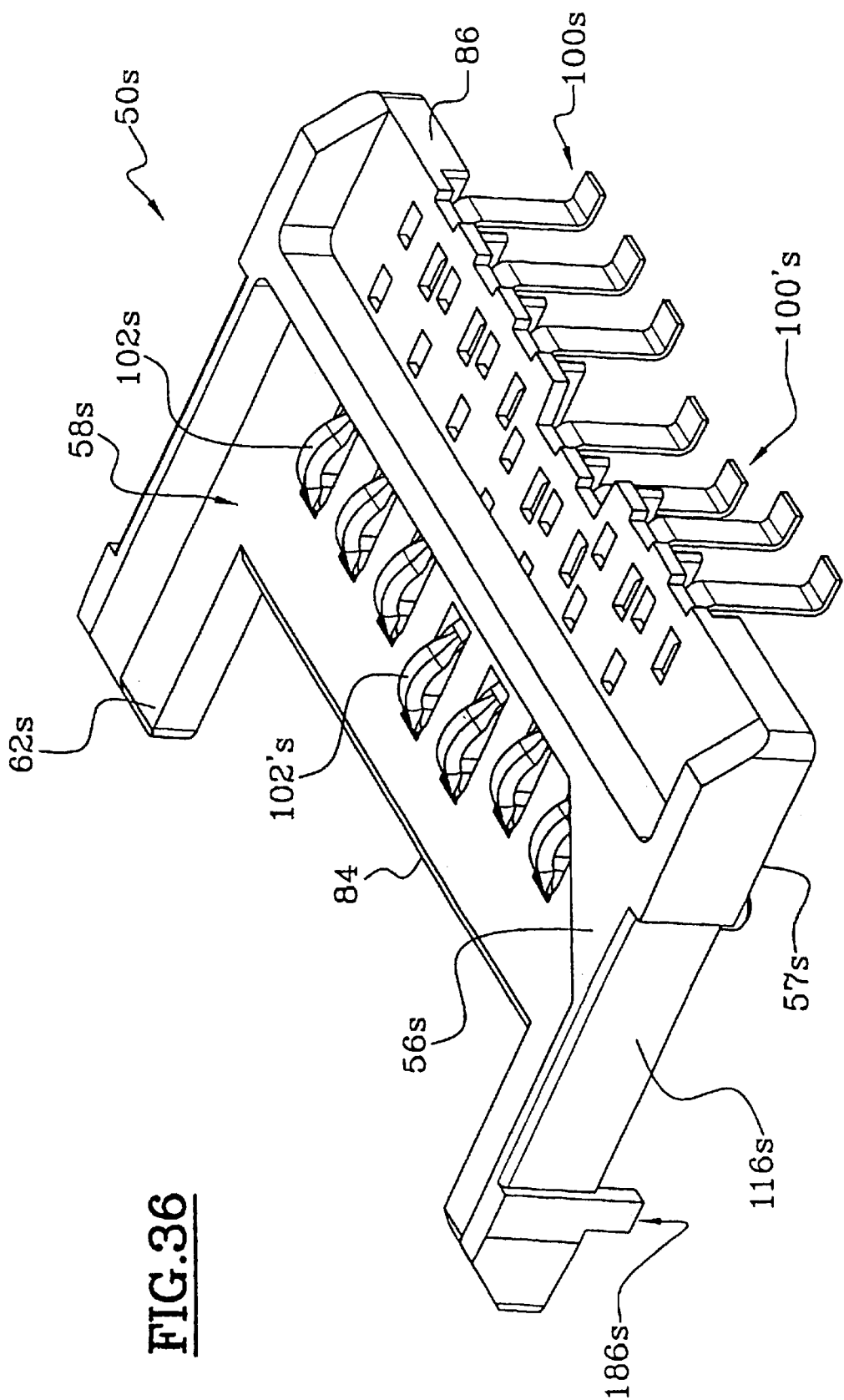
FIG. 36 is a top and front isometric view of the upper connector of FIG. 35.
Figure 37:
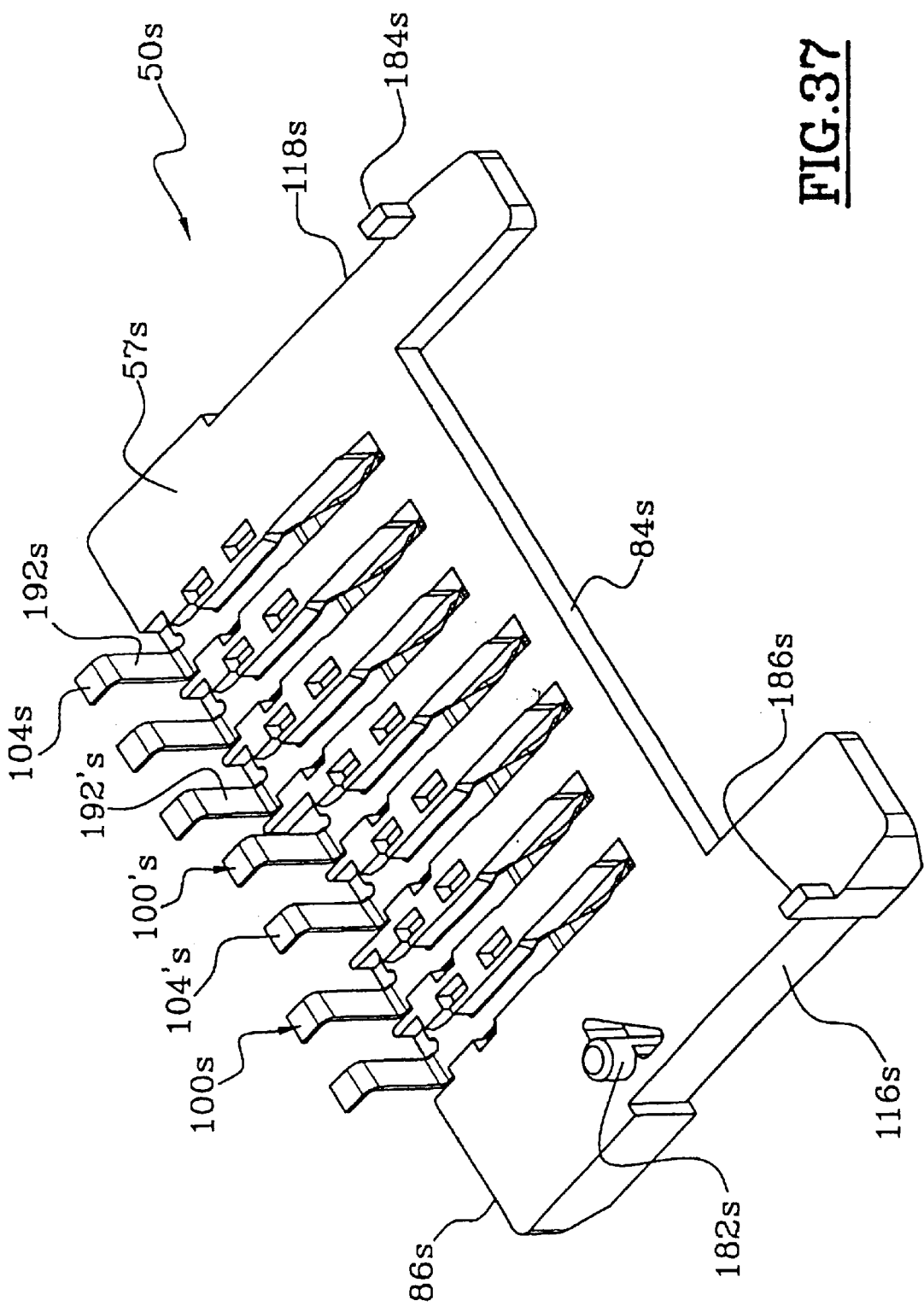
FIG. 37 is a bottom and rear isometric view of the upper connector of FIG. 35.
Figure 38:
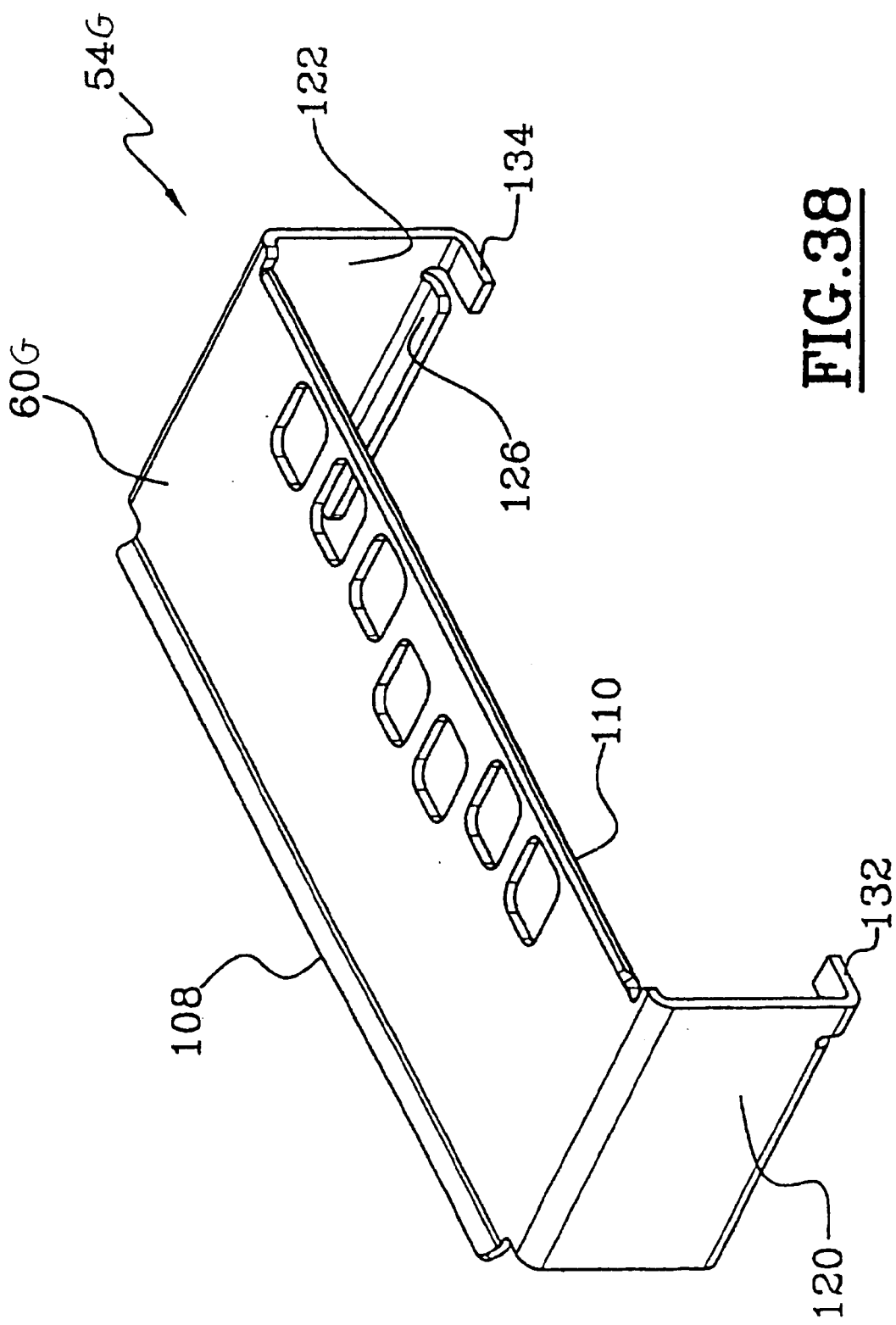
FIG. 38 is a top and front isometric view of the cover of the double connector of FIG. 25.

FIGS. 25–40 illustrate a double connector for connecting to two cards. As shown in FIG. 25, the upper and lower cards Cs and Ci are connected through upper and lower connectors 50s and 50i. Each connector includes a molded plastic support or support element, and a set of contacts. The lower connector 50i, shown in FIG. 34, is substantially identical to the single connector shown in FIG. 1, with the upper connector 50s, shown in FIG. 35, being modified. As shown in FIG. 34, the lower connector 50i has a top surface 56i with a hole 180. The hole receives a complimentary stud 182s (FIG. 37). Also, laterally opposite tabs 184s, 186s extend downwardly into notches shown in FIG. 34 at 188i, 190i formed in laterally opposite faces such as 116i (FIG. 26) of the lower connector. As shown in FIG. 37, the lower face 57s of the upper connector is flat and smooth and lies against the upper face of the lower card.

The double connector 500 shown in FIG. 25, has a single metal cover 54G whose design is similar to that of the cover of FIG. 1, except that its lateral flanges 120G, 122G are of greater height so as to extend along the laterally opposite side walls of the two connectors.

Figure 26:
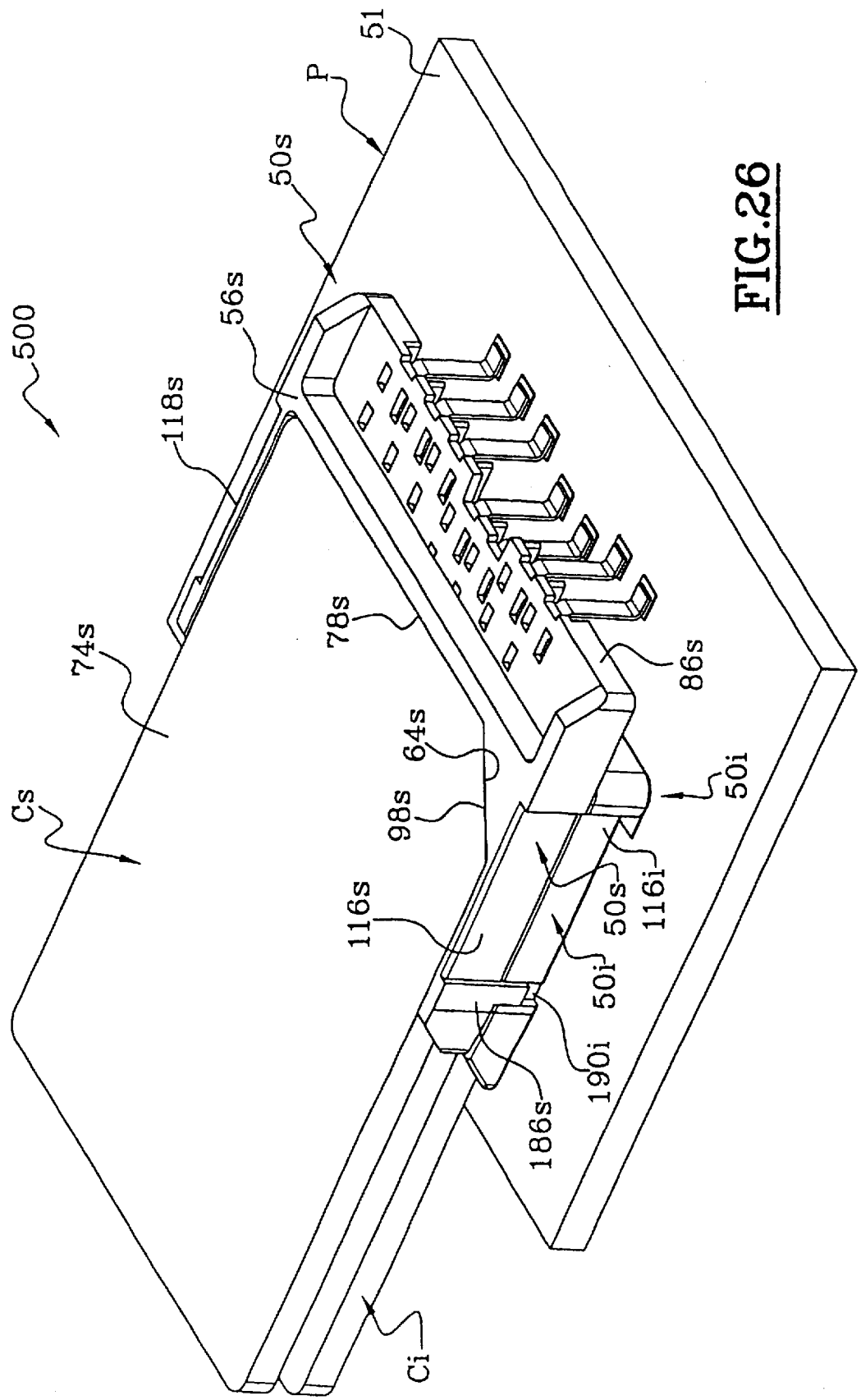
FIG. 26 is a view similar to that of FIG. 25, but without the metal cover.
Figure 27:
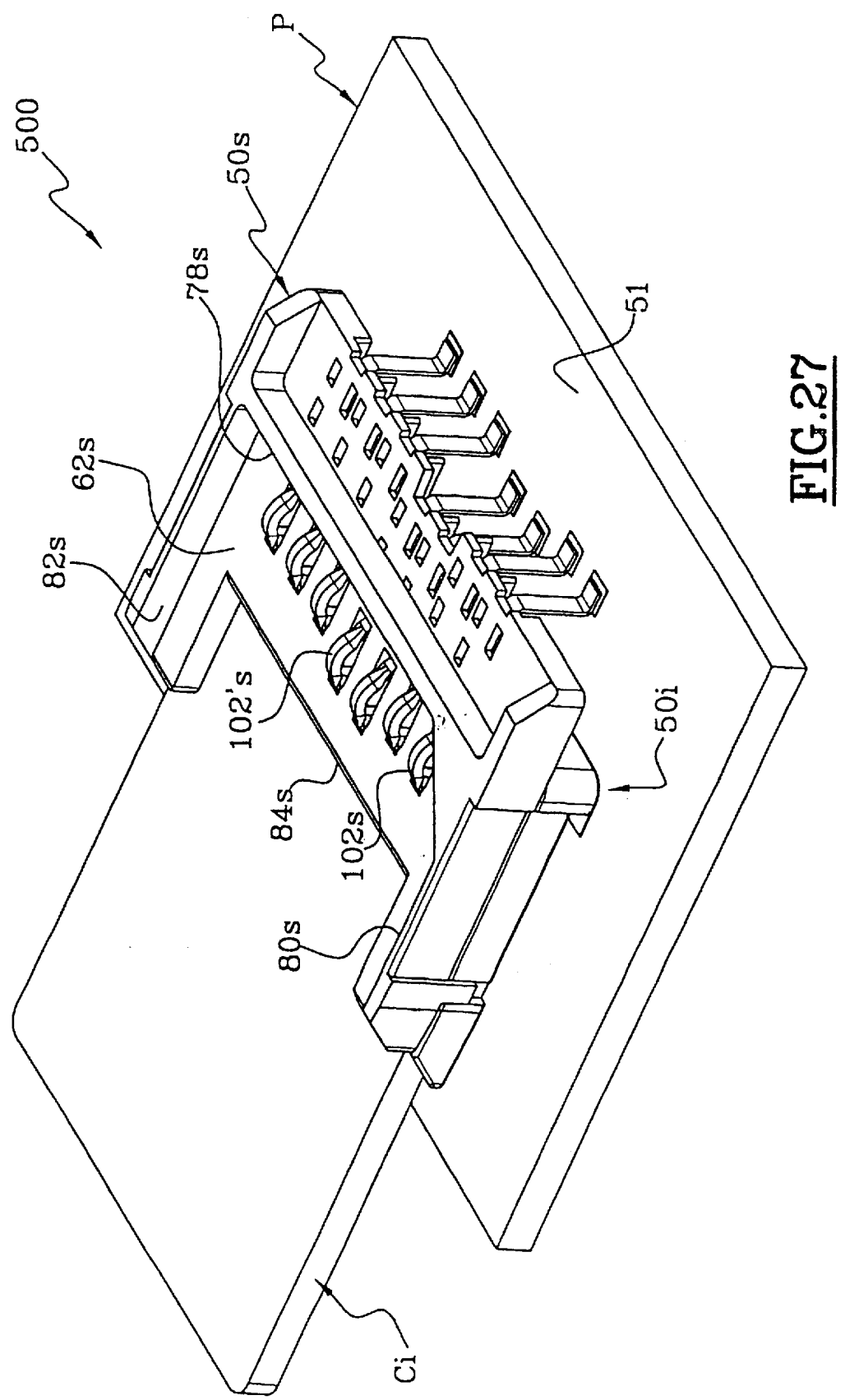
FIG. 27 is a view similar to that of FIG. 26, with the lower card fully inserted but without the upper card.
Figure 28:
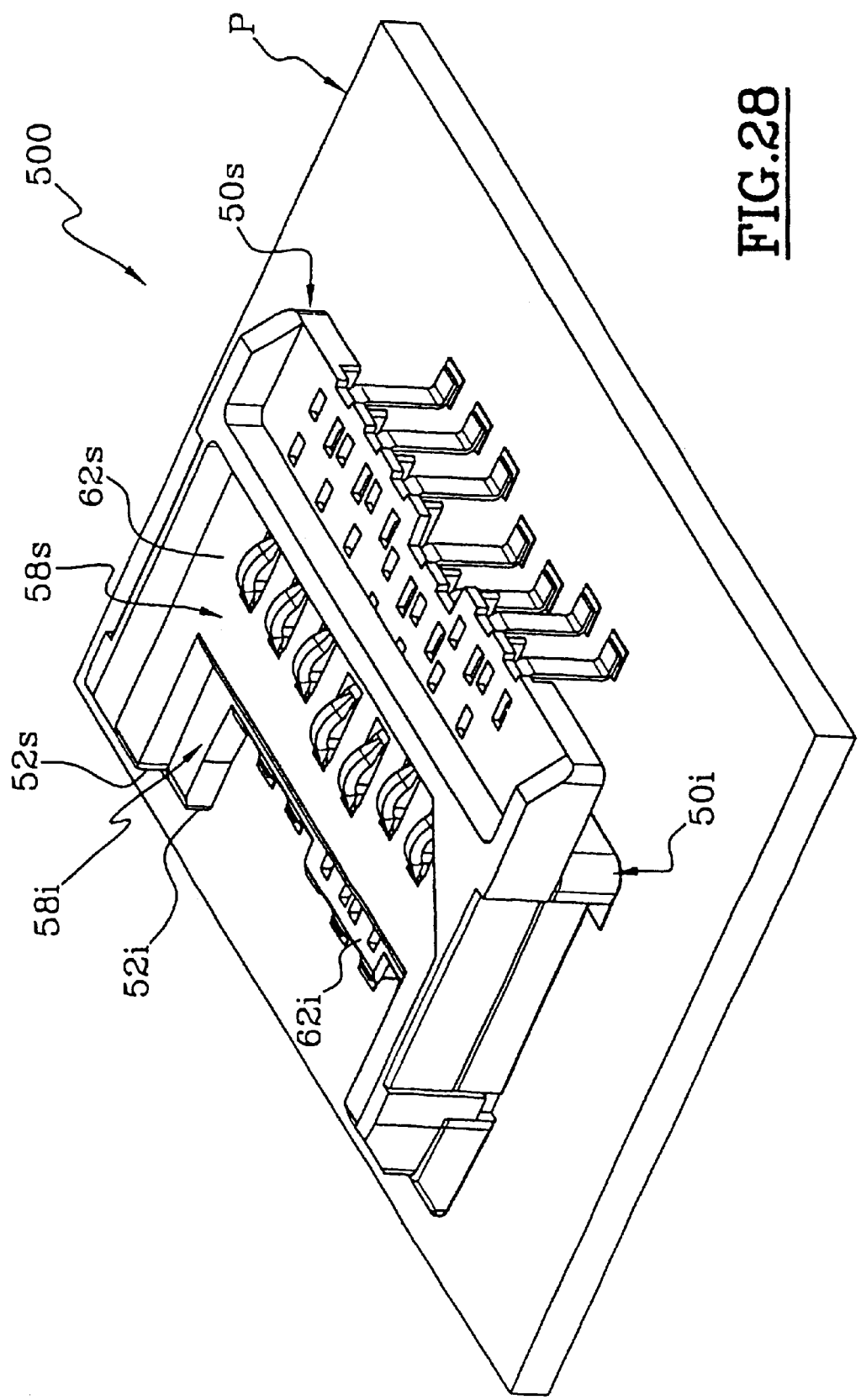
FIG. 28 is a view similar to that of FIG. 27, but without any card.
Figure 29:
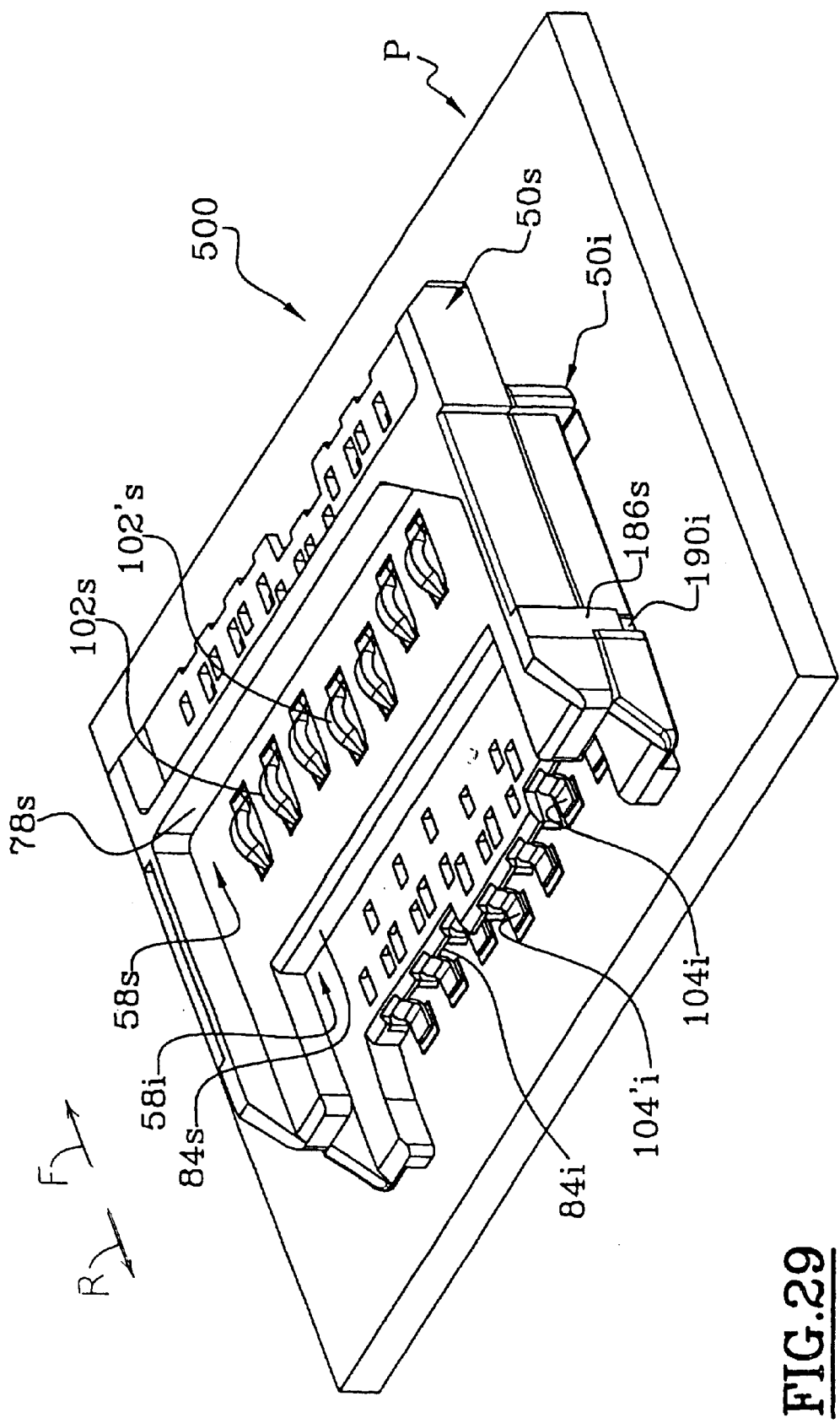
FIG. 29 is a top isometric view of the connector of FIG. 28, but taken from the rear.

As shown in FIG. 26, the upper face 74s of the upper card Cs is approximately flush with the upper surface 56s of the upper connector 50s. FIG. 25 shows that the upper plate 60 of the cover extends above the upper card Cs to define the upper card-holding cavity. FIG. 31 shows the relative positioning of the two connectors, with the forward stop edges 78i and 78s of the lower and upper cavities being aligned in a longitudinal direction.

Although the tails of the lower contacts lie rearward of most of the support, the tails of the upper contacts 100s, 100's (FIG. 25) extend forwardly and then extend downwardly at the front end of the support. The upper contacts have right angle bends to form tall vertical sections 192s, 192's (FIG. 31). The lower ends of the tails are designed to be soldered to traces on the circuit board. When comparing FIG. 30 with FIG. 3, it can be seen that the longitudinal dimension of the double connector 500 is about the same as the longitudinal dimension of the single connector 50 of FIG. 3.

Figure 39:
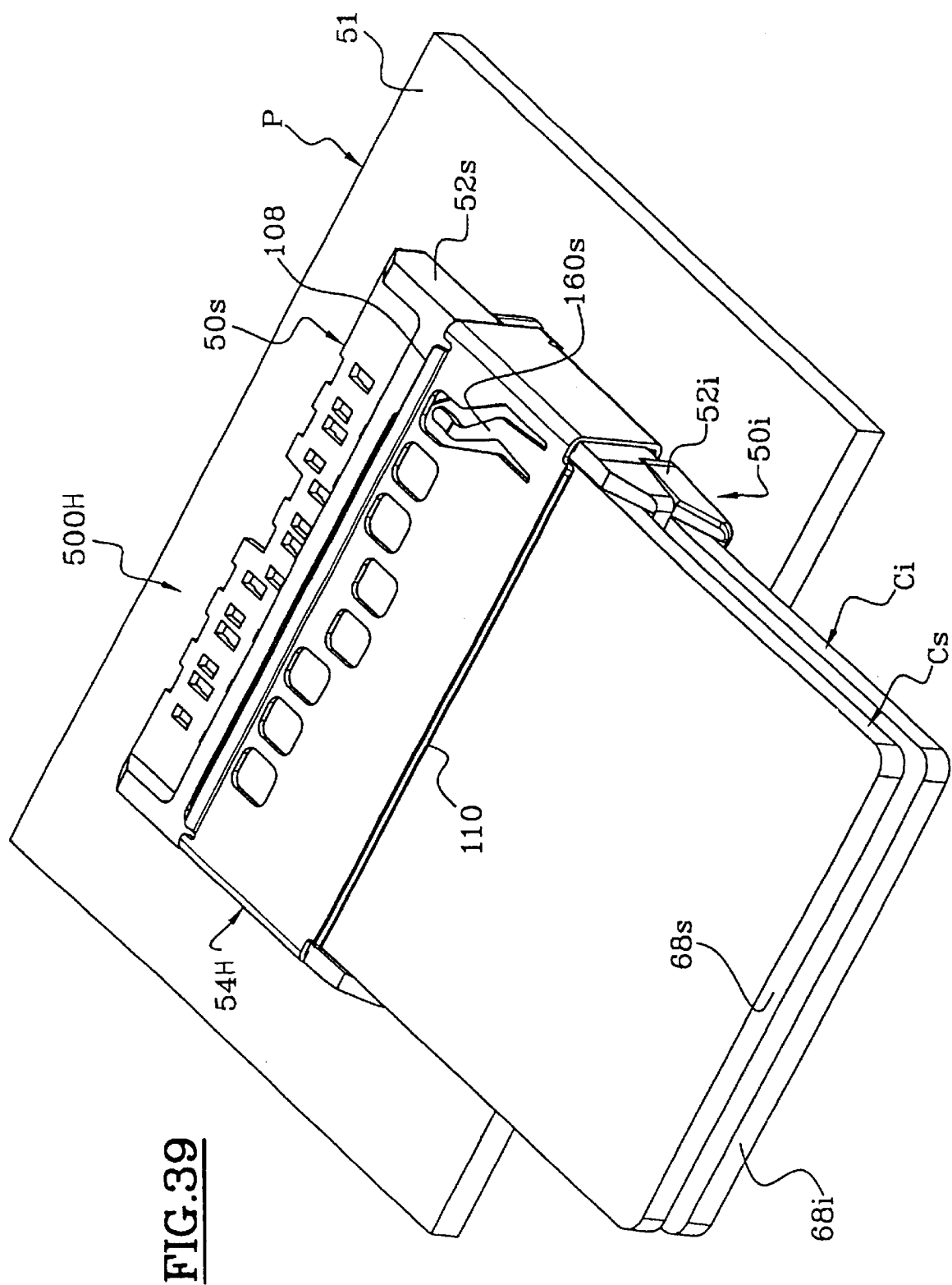
FIG. 39 is a top and rear isometric view showing a double connector similar to that of FIG. 25, but having a modified cover that incorporates a switch blade for detecting the presence of the upper card.
Figure 40:
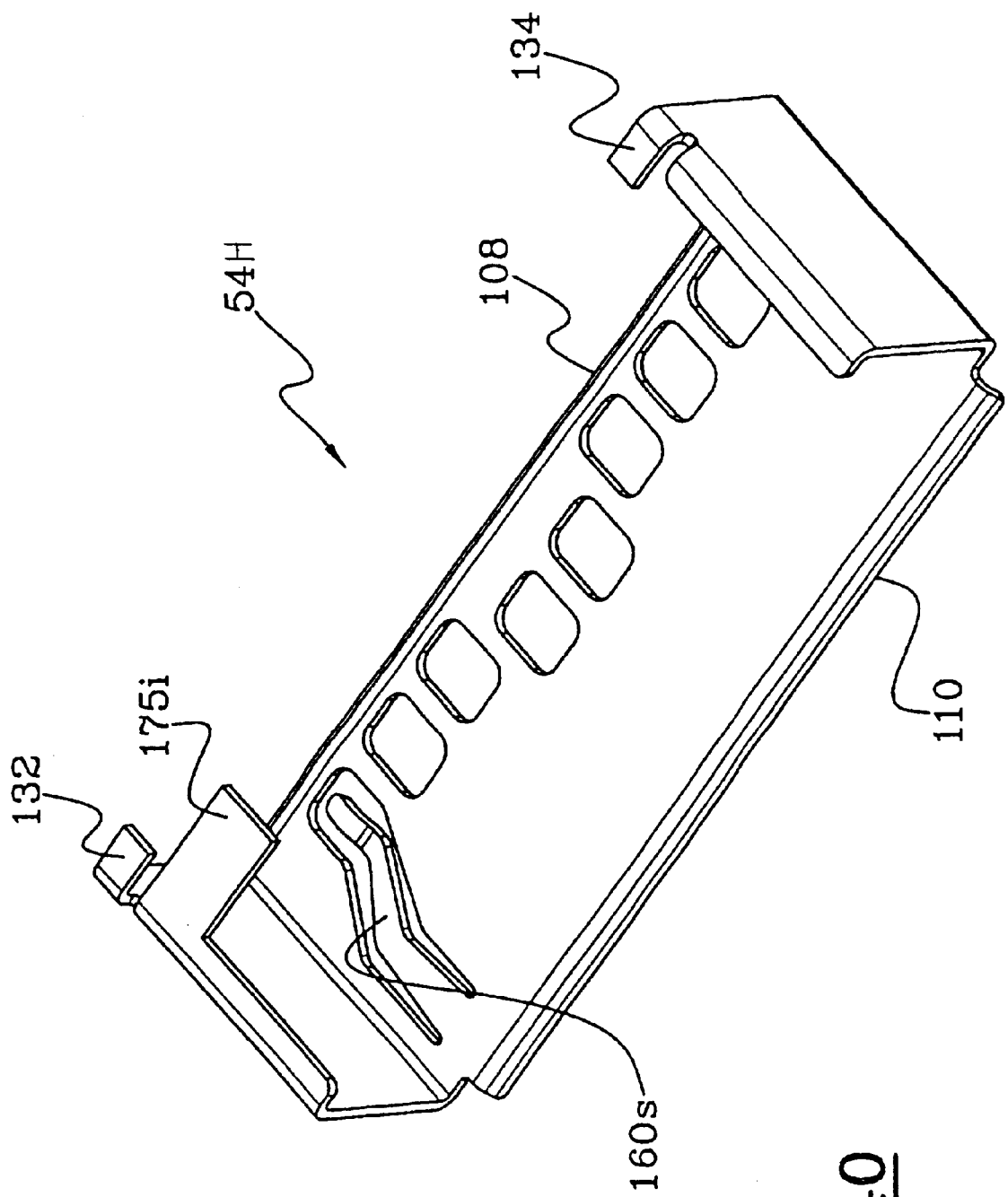
FIG. 40 is a bottom isometric view of a cover of the double connector of FIG. 25, with a modification of its lower part to form a switch to detect the presence of the lower card in the connector.

FIGS. 39 and 40 show the double connector 500H with two switches for detecting the presence of each of the two cards Cs and Ci. The upper switch is formed by the blade 160s whose function is described in connection with FIGS. 18–20. The lower switch is of the type described above in connection with FIGS. 21–24.

As shown in FIG. 18, the free end of the switch blade 162 lies within an imaginary polarized region 220 which is a square whose hypotenuse, or diagonal, is the polarized edge 98 that abuts the polarized corner of the card. The tip of any switch element preferably lies at least partially within this region 220. This is because the free end 166 of the blade can lie close to the edge 98 without lying very close to the stop edge 78 that abuts the front edge of the card. The polarized corner occupies less than 25% of the width of the card, and actually about 15% of the width.

While terms such as "upper", "lower", "horizontal", etc., has been used to help describe the invention as it is illustrated, it should be understood that the electrical connector can be used in any orientation with respect to the Earth.

Thus, the invention provides an electrical connector for connecting to pads on a circuit card, where the connector has a small longitudinal length and is of simple construction. The connector includes an insulative support with a card-engaging face that includes a contact-holding face part that includes the pad-engaging ends of contacts. The card-engaging face part has a longitudinal length no more than half the longitudinal length of the card, with a fully inserted card having its rear end extending in a cantilevered fashion from the face part. A pair of extensions that lie laterally beyond the contact-holding face part, extend rearwardly, and may extend only a short distance. The extensions not only help guide a card, but help protect the tails of the contacts that are soldered to a circuit board, with the tails lying at the rear end of the contact-holding face part. A card hold-down includes a sheet metal cover that is fixed in position relative to the support. The cover has an upper plate lying over the card-engaging face to press down a card. The cover also has side flanges that extend at opposite sides of the support, the cover having a bottom that lies under the support. The bottom can be soldered to traces on the circuit board to ground the cover. A double connector can receive and connect to the pads of two cards, with the tails of the lower connector lying at the rear end of the contact-holding face part, and with the upper contacts having their tails lying at the front end of the upper support. Switches that detect full insertion of a card, have at least a portion of the card-engaging part lying in a square polarized region, with the hypotenuse of the square being the polarized edge of the support that engages the polarized corner of a card.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An electrical connector for making electrical connections with pads on an active face of a thin and flat circuit card, in combination with said circuit card, wherein said card has a predetermined length in a longitudinal direction and a predetermined width in a lateral direction, comprising:

an insulative support which has a horizontal card-engaging face, said face having a contact-holding face part of predetermined lateral width which is at least half said card width, said support having a rear edge at a rear end of said contact-holding face part, and said support forming a stop for abutting a front edge of said card with said stop lying at a front end of said contact-holding face part;

a plurality of pad-engaging contacts mounted on said insulative support and having pad-engaging ends projecting above said card-engaging face, with all of said pad-engaging ends lying within the area of said card-holding face part;

a card hold-down lying above the level of said card-engaging face;

said contacts have tails with soldering parts for soldering to traces on a board, and said soldering parts of said tails lie rearward of said rear edge of said card-supporting face part, and said card-supporting face having laterally opposite extension parts extending rearward of said soldering parts of said tails.

2. The connector described in claim 1 including said circuit board, and wherein:

said circuit board has an upper board face with a plurality of conductive traces, said support lies on said upper face, and said soldering parts of said tails are soldered to said traces.

3. The connector described in claim 1 including a circuit board with conductive traces, and wherein:

said card hold-down includes a sheet metal cover with an upper plate lying over said card and holding down said card against said pad-engaging ends of said contacts, said cover having opposite sides extending downwardly at laterally opposite sides of said support, and said cover having a bottom that is soldered to at least one of said traces on said circuit board.

4. The connector described in claim 3 wherein:

said circuit board has an upper board face with a plurality of conductive traces, said support lies on said upper face and said support has a rear edge, and said contacts have tails soldered to said traces at said support rear edge;

said cover bottom has a front end that lies at a front end of said support and said cover bottom is soldered to said traces at said front end of said cover bottom.

5. An electrical connector for making electrical connections with pads on an active face of a thin and flat circuit card that has laterally opposite edges, comprising:

a molded insulative support which has a horizontal card-engaging face with laterally opposite face side parts, said support having upstanding side guide walls for guiding said lateral edges of said card;

a plurality of pad-engaging contacts mounted on said insulative support and having pad-engaging ends projecting above said card-engaging face, said contacts having tails for soldering to said traces;

said card-engaging face has a lateral first width and has a contact-holding face part with a rear edge, said contact-holding face part having a smaller lateral width than said first width, said laterally opposite face side parts of said card-engaging face lying laterally beyond opposite sides of said contact holding face part;

said upstanding side guide walls and said laterally opposite face side parts extend rearward of said rear edge of said contact-holding face part;

said tails all lie at said rear edge of said contact-holding face part, with said upstanding guide walls and said laterally opposite face side parts extending rearward of said tails.

6. The connector described in claim 5, including:

a sheet metal cover that has a plate-shaped main part lying over said card-engaging face, said cover having a pair of flanges depending from laterally opposite sides of said main part and extending beyond laterally opposite sides of said support, and said cover having bottom branches extending toward each other and lying under said support;

said sheet metal cover being fixed against sliding on said support.

7. The connector described in claim 6 including:

a circuit board with an upper face having electrically conductive traces, with said support lying on said upper face; and wherein said cover is soldered to one of said traces.

* * * * *